(12) United States Patent
Sedghifar et al.

(10) Patent No.: US 12,326,894 B2
(45) Date of Patent: Jun. 10, 2025

(54) SYSTEMS AND METHODS FOR DETERMINING ETHNICITY SUBREGIONS

(71) Applicant: Ancestry.com DNA, LLC, Lehi, UT (US)

(72) Inventors: Alisa Elnaz Sedghifar, San Francisco, CA (US); Andre Everson Kim, Upland, CA (US); Ju Zhang, San Jose, CA (US); Ross Eugene Curtis, Cedar Hills, UT (US); Natalie Anne Swinford, Saratoga Springs, UT (US); Jeffrey Adrion, Salt Lake City, UT (US); Yong Wang, San Mateo, CA (US)

(73) Assignee: Ancestry.com DNA, LLC, Lehi, UT (US)

( * ) Notice: Subject to any disclaimer, the term of this patent is extended or adjusted under 35 U.S.C. 154(b) by 0 days.

(21) Appl. No.: 18/736,429

(22) Filed: Jun. 6, 2024

(65) Prior Publication Data
US 2024/0411793 A1 Dec. 12, 2024

Related U.S. Application Data

(60) Provisional application No. 63/506,722, filed on Jun. 7, 2023.

(51) Int. Cl.
*G06F 7/00* (2006.01)
*G06F 16/35* (2019.01)
(52) U.S. Cl.
CPC .................. *G06F 16/35* (2019.01)
(58) Field of Classification Search
CPC ........ G06F 16/35; G06F 16/36; G06F 16/285; G06F 16/322; G06F 16/258; G06F 16/906; G06F 16/90344; G06F 16/27; G06F 16/22; G06F 16/288; G06F 16/211; G06F 16/24564; G06Q 10/06311; G06Q 10/06393; G06Q 10/06316
See application file for complete search history.

(56) References Cited

U.S. PATENT DOCUMENTS

| | | | | |
|---|---|---|---|---|
| 8,713,434 | B2 * | 4/2014 | Ford | G06F 16/288 |
| | | | | 707/758 |
| 9,152,705 | B2 * | 10/2015 | Lamba | G06F 16/36 |
| 2007/0250487 | A1 * | 10/2007 | Reuther | G06F 16/35 |
| 2022/0245154 | A1 * | 8/2022 | Gylfason | G06F 16/27 |

* cited by examiner

*Primary Examiner* — Mohammad A Sana
(74) *Attorney, Agent, or Firm* — Fenwick & West LLP

(57) ABSTRACT

A computing device may receive an inheritance dataset of a target named entity. The device may access a plurality of clusters associated with a region, each cluster comprising inheritance data for a plurality of reference panel named entities. The device may determine that the inheritance dataset of the target named entity has at least a threshold amount of inheritance sequences that are classified to the region. The device may compare, for each cluster, the inheritance dataset of the target named entity to the reference panel named entities in the cluster to identify similarities and shared inheritance segments between the target named entity and the reference panel named entities. The device may determine, for each cluster, a metric based on the inheritance segments shared. The device may assign the target named entity to one or more ethnicities based on the comparison between the metric and the threshold specific to the cluster.

20 Claims, 17 Drawing Sheets

Trios

| precision_single | cM_threshold | cluster |
|---|---|---|
| 0.5 | 9.3 | ClusterA |
| 0.65 | 10.8 | ClusterA |
| 0.8 | 12.9 | ClusterA |
| 0.95 | 20.5 | ClusterA |

Single origin

| precision_single | cM_threshold | cluster |
|---|---|---|
| 0.5 | 11.4 | ClusterA |
| 0.65 | 13.1 | ClusterA |
| 0.8 | 15.3 | ClusterA |
| 0.95 | 20.3 | ClusterA |

FIG. 8

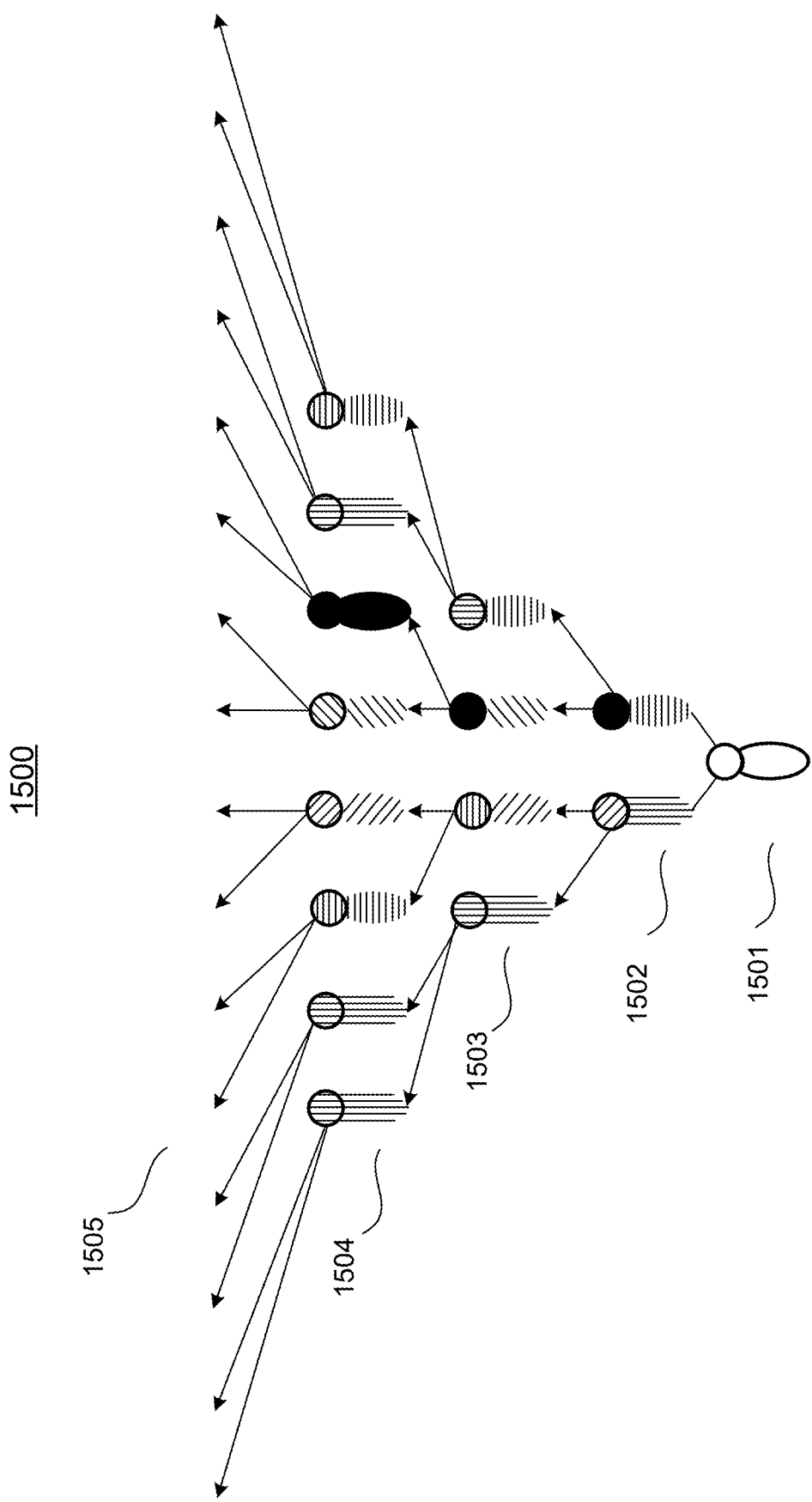

SYSTEMS AND METHODS FOR DETERMINING ETHNICITY SUBREGIONS

CROSS-REFERENCE TO RELATED APPLICATION

The present application claims the benefit of U.S. Provisional Patent Application No. 63/506,722, filed on Jun. 7, 2023, which is hereby incorporated by reference in its entirety.

FIELD

The disclosed embodiments relate to assigning individuals to one or more clusters.

BACKGROUND

Data-inheritance origins may be referred to as origins and describe how data may be inherited from real-world events. Data may be inherited and evolved based on real-world events that are not always recorded or documented. Yet, while the real-world events may not be completely documented, the change and inheritance of those events may be traceable by comparing data strings among data instances. For example, two data instances may be generated independently and individually reflect the status of their respective named entities or events. The data patterns in the data instances may reflect the natures, histories, or characteristics of data inheritance sources such as related or unrelated named entities or events. However, multiple data instances or corresponding named entities or events may be inherited from one or more common sources so that the data instances share some similarities in the data pattern. As such, the nature of inheritance may be revealed by analyzing and comparing the multiple data instances, and sometimes a large number of data instances. Those real-life events that result in shared data strings among data instances may be referred to as data inheritance events, even though those real-life events, at the time of the occurrence, may not involve data or data generation at all. For example, the real-life events may be historical events that occurred before the invention of computer or data but present data instances may still reflect those historical events.

SUMMARY

In some embodiments, the disclosure described herein relate to a computer-implemented method, including: receiving an inheritance dataset of a target named entity; accessing a plurality of clusters that are associated with a region, each cluster including inheritance data for a plurality of reference panel named entities; determining that the inheritance dataset of the target named entity has at least a threshold amount of data strings that are classified to the region; comparing, for each cluster, the inheritance dataset of the target named entity to the reference panel named entities in the cluster to identify shared data string segments between the target named entity and the reference panel named entities; determining, for each cluster, a metric based on the data string segments shared between the target named entity and the reference panel named entities included in the cluster; comparing, for each cluster, the metric to a threshold specific to the cluster; and assigning the target named entity to one or more data origins based on the comparison between the metric and the threshold specific to each cluster.

In some embodiments, the disclosure described herein relate to a system including: one or more processors; and memory configured to store instructions, wherein the instructions, when executed by the one or more processors, cause the one or more processors to perform steps including: receiving an inheritance dataset of a target named entity; accessing a plurality of clusters that are associated with a region, each cluster including inheritance data for a plurality of reference panel named entities; determining that the inheritance dataset of the target named entity has at least a threshold amount of data strings that are classified to the region; comparing, for each cluster, the inheritance dataset of the target named entity to the reference panel named entities in the cluster to identify shared data string segments between the target named entity and the reference panel named entities; determining, for each cluster, a metric based on the data string segments shared between the target named entity and the reference panel named entities included in the cluster; comparing, for each cluster, the metric to a threshold specific to the cluster; and assigning the target named entity to one or more data origins based on the comparison between the metric and the threshold specific to each cluster.

In some embodiments, the disclosure described herein relate to a non-transitory computer readable medium for storing computer code including instructions, when executed by one or more computer processors, causing one or more computer processors to perform steps including: receiving an inheritance dataset of a target named entity; accessing a plurality of clusters that are associated with a region, each cluster including inheritance data for a plurality of reference panel named entities; determining that the inheritance dataset of the target named entity has at least a threshold amount of data strings that are classified to the region; comparing, for each cluster, the inheritance dataset of the target named entity to the reference panel named entities in the cluster to identify shared data string segments between the target named entity and the reference panel named entities; determining, for each cluster, a metric based on the data string segments shared between the target named entity and the reference panel named entities included in the cluster; comparing, for each cluster, the metric to a threshold specific to the cluster; and assigning the target named entity to one or more data origins based on the comparison between the metric and the threshold specific to each cluster.

In yet another embodiment, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

FIG. 8 illustrates performances of simulations using single-origin and trios approaches, in accordance with an embodiment.

FIG. 15A illustrates a simulation of possible single-origin individuals in preceding generations from an admixed trio, in accordance with an embodiment.

Figure 1:
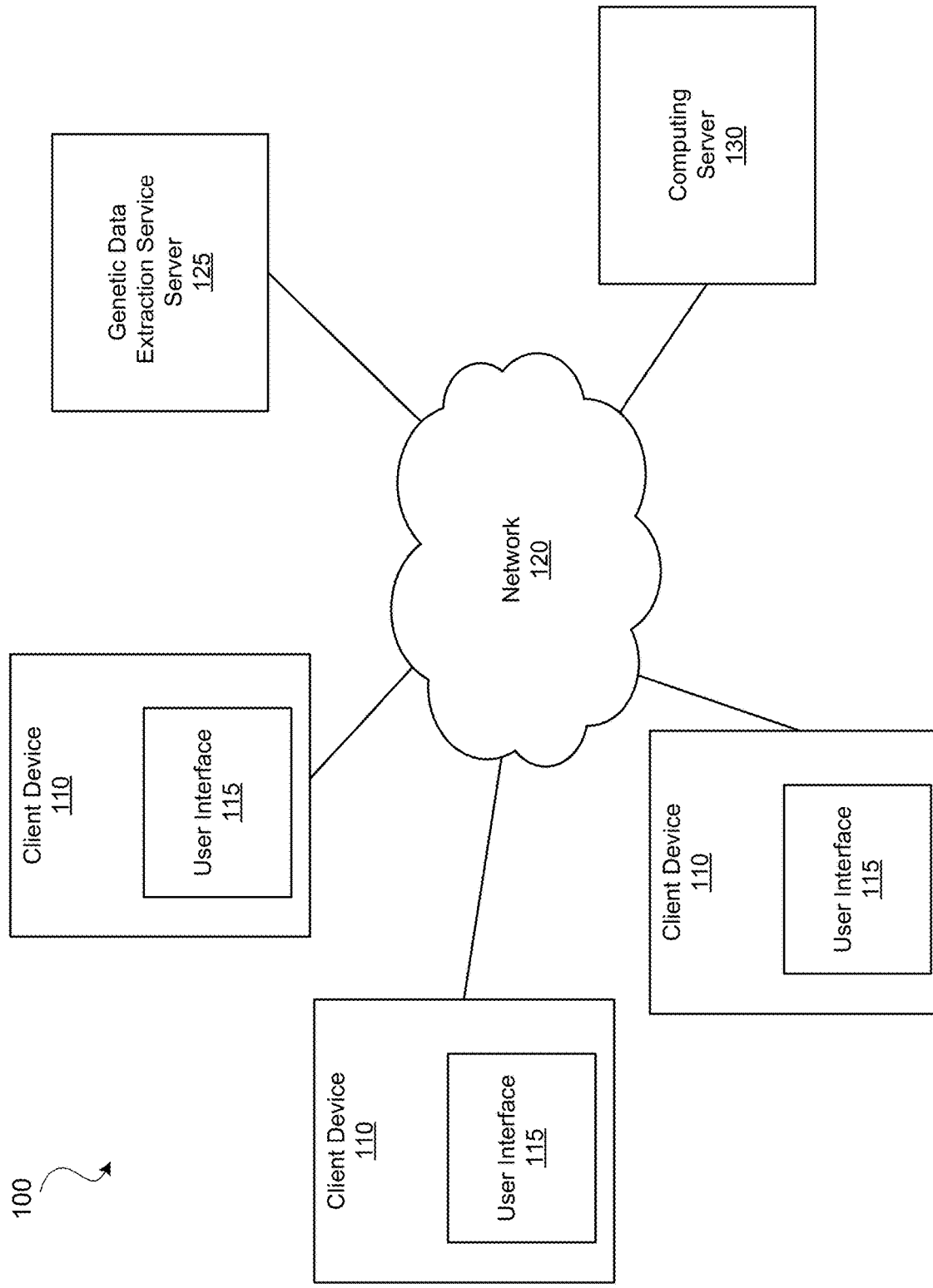
FIG. 1 illustrates a diagram of a system environment of an example computing system, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments of methods, systems, and computer-program products for generating data categorizations from unstructured data and assigning sample datasets thereto on the basis of short matching-data segments are provided in the present disclosure. Data categories may be generated or identified from the unstructured data, which may include samples representing tribes, ethnolinguistic groups, and/or countries, descendants of whom do not have robust historical record collections and/or whose descendants are connected only by short matching-data segments, e.g., DNA segments. The categories may be generated as unsupervised clusters identified using the Louvain method from a network including substantially only or even exclusively short matching-data segments and may have thresholds determined using admixed individuals simulated from founders populations, which may include single-origin individuals, and/or using a trios approach.

In some embodiments, systems, methods, and computer-program products for generating clusters and assigning datasets thereto as shown and described herein. In some embodiments, a computer-implemented method for determining whether a sample dataset corresponds to a data category of a plurality of data categories is provided. The computer computer-implemented method may include: generating a plurality of data categories from unstructured data, where the unstructured data includes DNA data and optionally ethnolinguistic metadata; determining assignment thresholds for each unsupervised cluster of the unstructured data, wherein determining the assignment thresholds comprises, for each unsupervised cluster, simulating an admixed constituent of the unsupervised cluster using a plurality of known cluster constituents, e.g. reference panel individuals, determining matches between the simulated admixed constituent and DNA data of the unstructured data; determining a match length corresponding to a predetermined precision level, and determining whether a sample dataset corresponds to an unsupervised cluster based on an average matched-segment length of a predetermined number of top matches of the sample dataset with the unsupervised cluster. Generating the plurality of data categories may include generating a network from the unstructured data; and identifying a plurality of unsupervised clusters within the unstructured data.

The plurality of unsupervised clusters within the unstructured data may be identified using the Louvain method. The simulation of an admixed individual may include using 64 founders and simulating over six generations. The 64 founders may be single-origin persons from the reference panel of the identified unsupervised cluster. The 64 founders may be selected using a trio method comprising, e.g., an 80-20 split. The matches may be identified using only "short" matching segments below approximately 8 centimorgans (cM), in embodiments below approximately 6 cM, in embodiments below 4 cM, or any other suitable upper threshold. The unsupervised clusters may be generated and/or labeled using metadata corresponding to one or more ethnolinguistic categories, such as nation, tribe, or language.

In some embodiments, a computer-implemented method includes: receiving a genetic dataset of a target individual; accessing a plurality of clusters that are associated with a region, each cluster comprising genetic data for a plurality of reference panel individuals; determining that the genetic dataset of the target individual has at least a threshold amount of genetic sequences that are classified to the region; comparing, for each cluster, the genetic dataset of the target individual to the reference panel individuals in the cluster to identify shared genetic segments between the target individual and the reference panel individuals; determining, for each cluster, a metric based on the genetic segments shared between the target individual and the reference panel individuals included in the cluster; comparing, for each cluster, the metric to a threshold specific to the cluster; and assigning the target individual to one or more ethnicities corresponding to the plurality of clusters based on the comparison between the metric and the threshold specific to each cluster.

Large-scale genealogy databases, containing tens of billions of data records, enable users to build family trees, research their family history, and uncover invaluable information about their ancestors. Identifying relatives within these vast databases is not a trivial task and presents significant challenges as the connection between datasets associated with different individuals may not be easily determined.

Further, individuals lacking historical records that verify migration and other family-history details may struggle to trace their roots. This issue is particularly prevalent for members of certain ethnic groups, who may have experienced historical displacement or involuntary migration. Unfortunately, documentation containing crucial information such as ancestors' birthplaces, birthdates, and other valuable details for these individuals has been largely lost over time. This absence of records makes it exceedingly challenging for members of these ethnic groups to conduct family history research and establish meaningful connections with or identify their ancestral origins.

Researchers working on family histories for such ethnic groups often resort to utilizing "short" matching-data segments, typically 6-8 cM of DNA shared by identity by descent (IBD) between two individuals, to make progress in their investigations. However, the low accuracy, high noise, limited applicability, and high cost of these short match segments render them less than ideal for unlocking valuable insights. Consequently, many consumer genetics databases choose not to incorporate these segments in existing ethnicity- and community-specific user features and products, further impeding such research efforts. This situation leaves members and descendants of these ethnic groups with limited ability to pinpoint the tribe, ethnicity, or country they have ancestral ties to, further limiting their ability to appreciate, connect with, and explore their family history.

Embodiments of the present disclosure encompass methods, systems, and computer-program products for generating or identifying categorizations from unstructured data and assigning or categorizing a data sample into one of the identified categories based on a threshold amount of genetic sequences, which may include a cumulative length of shared sequences and/or a threshold number of shared sequences. It should be appreciated that the threshold amount of genetic sequences, as used herein, may include short matching-data segments between the data sample and the respective category, and those short matching-data segments may be described with respect to a threshold number and/or cumulative length of DNA sequences. "Unstructured data" may refer to genetic data collected from various individuals with diverse backgrounds and ethnicities. Unstructured data may not have a predefined, unifying organization or structure and could include identifying information related to different ethnicities, populations, or regions. Embodiments of the present disclosure may involve generating unsupervised clusters from the unstructured data utilizing approaches such as the Louvain method. Additionally, they may entail creating thresholds for the assignment of data samples to one or more unsupervised clusters by employing simulations of admixed data samples that are consistent with the components present within the unsupervised clusters.

The disclosed embodiments advantageously facilitate the generation of categorizations from unstructured data and the assignment of sample datasets to one or more of identified or generated categories based on short matching segments. In the context of genetic genealogy, individuals belonging to specific ethnic groups who do not have an abundance of historical records that can reliably tie them to a country, ethnicity, tribe, or other community of origin, and who do not have sufficiently many "long" match segments to reliably place them within a community using genetic analysis alone, may benefit from this approach. Short matching-data segments (e.g., 6-8 cM) may facilitate such connections, as such users may have short matching-data segments that can be utilized to connect them to a long-lost ethnicity. These short matching-data segments are typically filtered by genetic research services due to the innate noise that they may generate. As a result, these users may now have the opportunity to explore, identify, and connect meaningfully with their ethnicities and communities of origin.

The disclosed embodiments may include generating and/or subdividing a reference panel for identifying groups or categorizations to which to assign sample and/or target datasets, such as DNA data, and may utilize a novel assignment strategy for assigning target datasets to the identified categorizations. This advantageously allows persons who are only connected to communities or ethnicities of origin by short matching-data segments to meaningfully explore and connect with those communities and/or ethnicities in ways that heretofore have not been possible.

The reference panel(s) may be generated using a pool of DNA samples from countries or regions of interest. To categorize the pool of DNA samples into the aforementioned ethnic groups, a sample pool for a reference panel may be generated with samples from or corresponding to a plurality of countries, in embodiments the plurality of countries corresponding or belonging to an overarching region. In one embodiment, the sample pool may cover 19 countries, 129 tribes, and 44 language families from various regions within a larger area, such as a continent. These samples may include or be associated with metadata including, e.g., tribal, linguistic, ethnic, national, or other affiliations. In some embodiments, the samples may be filtered to remove samples from countries that historically were not known to be involved in the movement or migration of these specific ethnic groups and/or to exclude samples with known recent admixture among various ethnicities. In yet other embodiments, samples with a determined cumulative ethnicity of less than 95% of a pre-determined ethnicity-assignment prediction may be filtered as well. It will be appreciated that this threshold, as with other thresholds disclosed herein, is merely exemplary and the disclosure is not limited thereto.

It was surprisingly found that using metadata labels to assign samples to sample categories corresponding, e.g., to countries in Africa, was not effective because of the challenges associated with historical nuances given the historic changes to national boundaries, migration patterns, ethnic boundaries, and other interdependencies.

It was, however, surprisingly found that an unsupervised clustering process may be performed on the filtered samples to identify a plurality of groups within the sample pool such that datasets representing persons' genetic samples may be assigned accurately therebetween regardless of the nuances inherent in national and ethnic histories. For example, a matching algorithm may be utilized to identify matches within the samples so as to generate an IBD network, which may be subdivided into a plurality of unsupervised clusters using, e.g., the Louvain method. This may be performed in an analogous manner to the methodology described in U.S. Pat. No. 10,223,498, granted Mar. 5, 2019, which is hereby incorporated in its entirety by reference. In other words, it was surprisingly found that persons linked to their ethnic roots only by short matching-data segments can be connected to their ethnicities and communities of origin using an unsupervised clustering and assignment method and approach as described in embodiments herein.

The matching algorithm may be modified to optimize performance on short match scenarios, in embodiments, with length of match segments and length of total match modified as necessary. For example, it may be desirable to optimize the number of total matches while minimizing the proportion of the number of cross-cluster matches (which generate noise). It was surprisingly found that performance of the short matching-data segment cluster-identification process was optimized by filtering, in embodiments, longest matched segment lengths to no less than 4 cM while filtering total match length to no less than 5 cM, longest matched segment lengths to no less than 4 cM while filtering total match length to no less than 7 cM, and/or longest matched segment lengths to no less than 5 cM while filtering total match length to no less than 8 cM. This yielded optimal results in view of the number of total matches compared to cross-cluster matches. In other embodiments, a large improvement was observed from adjusting the filters from longest matched segment lengths of no less than 3 cM while filtering total match length to no less than 6 cM to longest matched segment lengths of no less than 3 cM while filtering total match length to no less than 7 cM, resulting in a substantial reduction in cross-cluster matches with an acceptable corresponding reduction in matches. Similarly, it was surprisingly observed that adjusting the filters from longest matched segment lengths of no less than 4 cM while filtering total match length to no less than 4 cM to longest matched segment lengths of no less than 4 cM while filtering total match length to no less than 5 cM resulted in a substantial reduction in cross-cluster matches with an acceptable corresponding reduction in matches. However, adjusting from longest matched segment lengths of no less than 5 cM while filtering total match length to no less than 5 cM to longest matched segment lengths of no less than 5 cM while filtering total match length to no less than 6 cM, or greater did not result in a substantial reduction in cross-cluster matches with an acceptable corresponding reduction in matches. It will be appreciated, however, that the disclosure is not limited to such parameters, but rather may be utilized with any suitable parameters or filters. The parameters of the matching algorithm may be tuned as discussed above in any suitable manner for generating a sufficient number of matches for meaningful cluster generation and match identification, while also reducing the noise from cross-cluster matches.

In some embodiments, an approach, utilizing short matching-data segments below 8 cM, is unconventional in that such matches are normally filtered out and not relied upon in determination of matches, communities, and other genetic insights given the innate unreliability associated with such short matching-data segments. The novel combination of statistical approaches of embodiments described herein may allow for accurately and reliably deriving meaningful insights from short matching-data segments, which for many persons such as the aforementioned ethnic groups, is all that connects them to their roots.

In some embodiments, iterations of this process may be performed on particular clusters identified in or from an IBD network. For example, if certain identified clusters have substantially more samples than others, the Louvain method may be performed again on only those reference panel samples corresponding to the large clusters to yield additional more-granular clusters. This may be performed one or more times on any of the identified clusters from the first round. Additionally, or alternatively, where it is determined that certain clusters generated in one or more of the iterations has no logical bearing to historical or current patterns, the cluster may be further subdivided.

In some embodiments, outliers may be further filtered based on, e.g., match distribution and/or tribe and/or language information. Samples that are not closely related to other samples in each cluster may be removed if it is determined that certain samples are only included for lack of a more-suitable cluster, or if it is determined that tribe/language metadata associated with the sample are inconsistent with metadata associated with other samples in the cluster. For instance, a suitable threshold relating to a metric such as cM, number of shared segments, etc. may be determined for one or more clusters below or above which threshold samples may be filtered.

The present subject matter describes computer-implemented methods and systems for assigning individuals to one or more ethnicities based on their genetic data. The present subject matter involves receiving a genetic dataset of a target individual, accessing clusters of genetic data from reference panel individuals, and comparing the target individual's genetic dataset to the genetic data within each cluster. The present subject matter then determines a metric based on shared genetic segments, compares the metric to a pre-determined threshold to assign the target individual to an ethnicity.

By utilizing advanced computational methods and analyzing shared genetic segments among individuals, the present subject matter can provide accurate and precise ethnicity assignments. The present subject matter can filter and organize samples based on various criteria, such as genetic relatedness, tribe, and language information. This allows for more detailed and accurate analyses of an individual's genetic background. By accurately assigning individuals to specific ethnicities, the present subject matter can help users gain a better understanding of their genetic ancestry and history. The identification of an individual's ethnicity could potentially assist in the development of personalized medical treatments and health plans, as certain genetic predispositions to diseases or conditions may be more prevalent within specific ethnicities. Further, the present subject matter can contribute to anthropological studies by helping identify and analyze migration patterns, genetic similarities, and interrelationships among human populations across different historical timeframes. Accurate assignment of individuals to specific ethnicities can improve genealogical research and the understanding of familial connections and lineages.

The present subject matter further describes computer-implemented methods and systems for analyzing an individual's genetic dataset and assigning them to a specific ethnicity subregion. The present subject matter aims to enhance the specificity of ancestry connections by identifying and analyzing IBD segments, improving ethnicity estimates, and providing a more accurate assignment of individuals to their corresponding ethnicity subregions.

The present subject matter may provide more detailed insight into individuals' ethnic origins and ancestry connections, improving the overall experience for customers seeking a deeper understanding of their ancestry.

The present subject matter may refine subregion identification and assignment processes by considering shared IBD segments and/or geographical and ethnical identities, thus increasing the accuracy and specificity of an individual's assignment to a relevant subregion.

By generating scores based on shared IBD segments between a target individual and reference panel individuals within each subregion, the present subject matter may allow more—informed and—accurate assignments of target individuals to relevant ethnicity subregions.

Example System Environment

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet-switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as microarray, amplification and/or sequencing. Microarray may include immobilizing probe DNA sequences, onto a solid surface such as a glass slide. Target DNA samples, labeled with fluorescent tags, are then applied to the microarray surface. Through complementary base pairing, the labeled DNA binds to its corresponding probe on the microarray. By detecting the fluorescence emitted by the labeled DNA, genetic data may be extracted. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina Human-Hap 650Y Platform) may be obtained as genetic data. Genetic data extraction service server 125 receives biological samples from users of the computing server 130. The genetic data extraction service server 125 extracts genetic data from the samples and the data may take the form of a set of SNPs. The genetic data extraction service server 125 generates the genetic data of the individuals based on sequencing or microarray results. The genetic data may include data generated from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from DNA identification results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the inheritance dataset of an individual. SNPs, base pair sequences, genotypes, haplotypes, RNA sequences, protein sequences, and phenotypes are examples of biomarkers. In some embodiments, each SNP site may have two readings that are heterozygous.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed on the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to the user's privacy setting and authorization, the computing server 130 may allow information generated from the user's inheritance dataset to be linked to the user profile and to one or more of the family trees. The users may also authorize the computing server 130 to analyze their inheritance dataset and allow their profiles to be discovered by other users.

Example Computing Server Architecture

Figure 2:
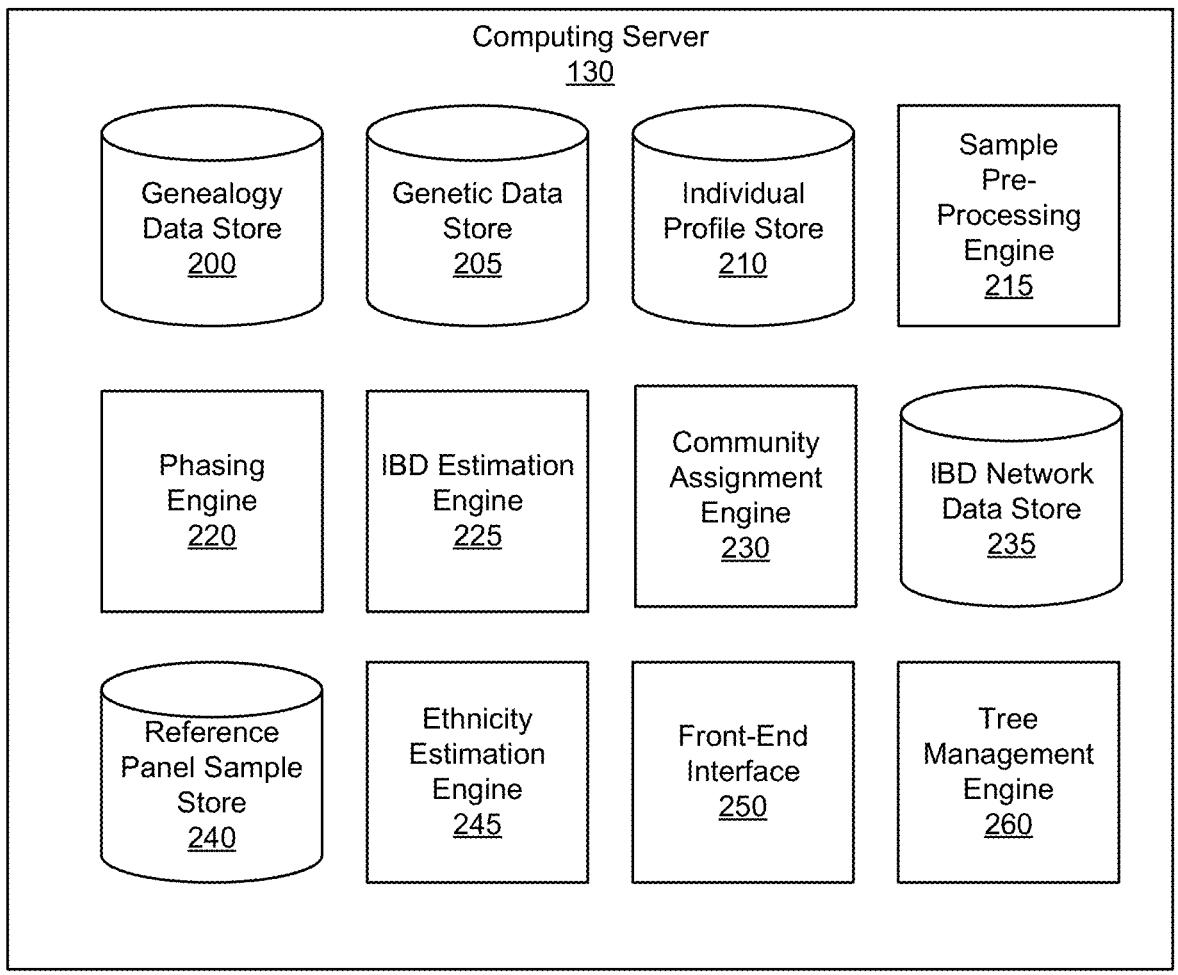
FIG. 2 is a block diagram of an architecture of an example computing system, in accordance with some embodiments.

FIG. 2 is a block diagram of the architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 260, and a tree management engine 250. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections between a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains inheritance datasets of individuals in the genetic data store 205. An inheritance dataset of an individual may be a digital dataset of nucleotide data (e.g., SNP data) and corresponding metadata. For example, an inheritance dataset may be genetic data extracted by the genetic data extraction service server 125. An inheritance dataset may contain data on the whole or portions of an individual's genome. The genetic data store 205 may store a pointer to a location associated with the genealogy data store 200 associated with the individual. An inheritance dataset may take different forms. In some embodiments, an inheritance dataset may take the form of a base pair sequence of the sequencing result of an individual. A base pair sequence dataset may include the whole genome of the individual (e.g., obtained from a whole-genome sequencing) or some parts of the genome (e.g., genetic loci of interest). A microarray data may take the form of SNP data at target positions in the genome.

In another embodiment, an inheritance dataset may take the form of sequences of genetic markers. Examples of genetic markers may include target SNP sites (e.g., allele sites) filtered from the DNA identification results. A SNP site that is a single base pair long may also be referred to as a SNP locus. A SNP site may be associated with a unique identifier. The inheritance dataset may be in the form of diploid data that includes a sequence of genotypes, such as genotypes at the target SNP site, or the whole base pair sequence that includes genotypes at known SNP sites and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating inheritance datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to the environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g., stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and research conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide heightened privacy as a default setting for certain types of data, such as genetic data or any data that the user marks as sensitive. The user may opt in to sharing those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

In some embodiments, the individual profile store 210 may be a large-scale data store. In some embodiments, the individual profile store 210 may include at least 10,000 data records in the form of user profiles and each user profile may be associated with one or more inheritance datasets and one or more genealogical data entries. In some embodiments, the individual profile store 210 may include at least 50,000 data records in the form of user profiles and each user profile may be associated with one or more inheritance datasets and one or more genealogical data entries. In some embodiments, the individual profile store 210 may include at least 100,000 data records in the form of user profiles and each user profile may be associated with one or more inheritance datasets and one or more genealogical data entries. In some embodiments, the individual profile store 210 may include at least 500,000 data records in the form of user profiles and each user profile may be associated with one or more inheritance datasets and one or more genealogical data entries. In some embodiments, the individual profile store 210 may include at least 1,000,000 data records in the form of user profiles and each user profile may be associated with one or more inheritance datasets and one or more genealogical data entries. In some embodiments, the individual profile store 210 may include at least 2,000,000 data records in the form of user profiles and each user profile may be associated with one or more inheritance datasets and one or more genealogical data entries. In some embodiments, the individual profile store 210 may include at least 5,000,000 data records in the form of user profiles and each user profile may be associated with one or more inheritance datasets and one or more genealogical data entries. In some embodiments, the individual profile store 210 may include at least 10,000,000 data records in the form of user profiles and each user profile may be associated with one or more inheritance datasets and one or more genealogical data entries.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from the genetic data extraction service server 125. The genetic data extraction service server 125 may perform laboratory analysis of biological samples of users and generate sequencing results in the form of digital data. The sample pre-processing engine 215 may receive the raw inheritance datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's inheritance dataset. In some embodiments, the SNPs may be autosomal SNPs. In some embodiments, 700,000 SNPs may be identified in an individual's data and may be stored in genetic data store 205. Alternatively, in some embodiments, an inheritance dataset may include at least 10,000 SNP sites. In another embodiment, an inheritance dataset may include at least 100,000 SNP sites. In yet another embodiment, an inheritance dataset may include at least 300,000 SNP sites. In yet another embodiment, an inheritance dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases a diploid inheritance dataset into a pair of haploid inheritance datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to conditions and other constraints in sequencing or microarray, a DNA identification result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's inheritance datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

A phasing algorithm may also generate phasing result that has a long genomic distance accuracy and cross-chromosome accuracy in terms of haplotype separation. For example, in some embodiments, an IBD-phasing algorithm may be used, which is described in further detail in U.S. Patent Application Publication No. US 2021/0034647, entitled "Clustering of Matched Segments to Determine Linkage of Dataset in a Database," published on Feb. 4, 2021. For example, the computing server 130 may receive a target individual genotype dataset and a plurality of additional individual genotype datasets that include haplotypes of additional individuals. For example, the additional individuals may be reference panels or individuals who are linked (e.g., in a family tree) to the target individual. The computing server 130 may generate a plurality of sub-cluster pairs of first parental groups and second parental groups. Each sub-cluster pair may be in a window. The window may correspond to a genomic segment and has a similar concept of window used in the ethnicity estimation engine 245 and the rest of the disclosure related to HMMs, but how windows are precisely divided and defined may be the same or different in the phasing engine 220 and in an HMM. Each sub-cluster pair may correspond to a genetic locus. In some embodiments, each sub-cluster pair may have a first parental group that includes a first set of matched haplotype segments selected from the plurality of additional individual datasets and a second parental group that includes a second set of matched haplotype segments selected from the plurality of additional individual datasets. The computing server 130 may generate a super-cluster of a parental side by linking the first parental groups and the second parental groups across a plurality of genetic loci (across a plurality of sub-cluster pairs). Generating the super-cluster of the parental side may include generating a candidate parental side assignment of parental groups across a set of sub-cluster pairs that represent a set of genetic loci in the plurality of genetic loci. The computing server 130 may determine the number of common additional individual genotype datasets that are classified in the candidate parental side assignment. The computing server 130 may determine the candidate parental side assignment to be part of the super-cluster based on the number of common additional individual genotype datasets. Any suitable algorithms may be used to generate the super-cluster, such as a heuristic scoring approach, a bipartite graph approach, or another suitable approach. The computing server 130 may generate a haplotype phasing of the target individual from the super-cluster of the parental side.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish who immigrated to America in 1800, Irish who immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is the genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., containing fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors were born at a certain birthplace. The computing server 130 may also draw sequence data from the Human Genome Diversity Project (HGDP). Various candidates may be manually screened based on their family trees, relatives' birth location, and other quality controls. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020, and U.S. Pat. No. 10,692,587, granted on Jun. 23, 2020, entitled "Global Ancestry Determination System" describe different example embodiments of ethnicity estimation.

In some embodiments, the ethnicity subregion engine 265 performs computations and other processes related to determining ethnicity subregions and assigning individuals to one or more of those ethnicity subregions based on their genetic data. The ethnicity subregion engine 265 can determine, generate, and/or maintain a hierarchy of ethnicity regions. For example, the ethnicity subregion engine 265 organizes different ethnicities into groups based on one or more criteria in defining a main region and one or more subregions under the main region, creating a hierarchy that includes broader ethnicity regions and more specific ethnicity subregions. The ethnicity subregion engine 265 can build a hierarchy of a plurality of ethnicity regions. The hierarchy may be represented as one or more trees that has root nodes, branches, intermediate nodes, and end nodes. Whether a region is a main region or a subregion may be relative based on levels in the hierarchy. For example, a main region at one level may be a subregion of—or a region at—another level. In some embodiments, a set of subregions may be ethnicity regions that are historically difficult to distinguish based on population and/or IBD genetic data. For example, Latvia may be a main region at one level and Latvia, Russia, and Poland may be the subregions of a given ethnicity region at another level in the hierarchy.

As illustrated in the above example, regions and subregions do not need to be unique, and the hierarchy can be bidirectional in some situations. For example, underneath the node representing Latvia, there can be the subregion of Latvia itself along with other subregions whose populations have similar genetics. In another situation, at one level, Latvia, Russia, and Poland can all be regions while the subregions for each of these main regions may include one or more of Latvia, Russia, Poland and/or another subregions. The subregion list in each of those regions do not need to be identical but may share one or more subregions.

In embodiments, ethnicity subregions, as determined using embodiments of the present disclosure, may advantageously add granularity to previously and otherwise intractable ethnicity determinations, such as differentiating between a person's combined Swedish/Danish ethnicity to one or the other: Sweden, or Denmark, as opposed to reporting a consolidated ethnicity category to the user without offering further insight, as has been done in previous approaches. It has been found that existing ethnicity estimate approaches, without more, are sometimes unable to offer further distinction, particularly in closely related subregions where historical patterns make it difficult to distinguish between, e.g., Swedes and Danes on the basis of reference panel comparisons alone. Ethnicity subregions may further facilitate the distinction between Northern Latvia and Southern Latvia, for example, where previously users would only receive a more-generic Latvia ethnicity estimate.

The ethnicity subregion engine 265 may use ethnicity estimation engine 245 to determine an ethnicity main region of a target individual and use the process described herein, such as the process 300, to determine the precise ethnicity subregion to which the target individual should be assigned.

While in this disclosure European ethnicity and locations are used as primary examples in describing the regions and subregions, various engines, systems, and processes described herein may be applied to any regions and subregions and are not limited to Europe.

The ethnicity subregion engine 265 may define and identify region-subregions relationships based on one or more criteria, including genetic similarities among the population in a few regions, geographical proximity of the ethnical groups that share ancestral roots, historical data showing two regions being related, and other suitable criteria, such as any genetic, genealogical, geographical, cultural, ethnical, migration, historical criteria, and/or any combinations of criteria. In some embodiments, the hierarchy of ethnicity regions may be manually defined and refined based on an analysis of cross matching of genetic data stored in the genetic data store 205. In some embodiments, the hierarchy of ethnicity regions may also be defined using one or more algorithms. For example, the ethnicity subregion engine 265 collects and maintains genetic datasets of individuals from diverse ethnic and geographical backgrounds. The ethnicity subregion engine 265 may use clustering techniques, principal component analysis (PCA), Uniform Manifold Approximation and Projection (UMAP), hierarchical clustering, or machine learning models to group individuals according to their genetic similarity. This results in the formation of ethnicity regions and subregions.

The ethnicity subregion engine 265 can compare the genetic dataset of the target individual to reference panel individuals. For example, the ethnicity subregion engine 265 takes the genetic data of an individual and compares it to reference panel individuals of various ethnicity subregions. The ethnicity subregion engine 265 identifies IBD segments shared between the target individual and reference panel individuals using the IBD estimation engine 225. The ethnicity subregion engine 265 may store the IBD segments as a data object for future retrieval.

The ethnicity subregion engine 265 can generate a score for each ethnicity subregion for a given target individual to determine which ethnicity subregion(s) fit the genetic data of the target individual the most. For example, the ethnicity subregion engine 265 calculates a score for each ethnicity subregion based on the IBD segments shared between the target individual and reference panel individuals in the corresponding ethnicity subregion. Details of the determination are further discussed in FIG. 3.

The ethnicity subregion engine 265 can assign the target individual to one or more of the ethnicity subregions. For example, based on the generated scores, the ethnicity subregion engine 265 assigns the target individual to the ethnicity subregion with the highest score, indicating a higher degree of genetic similarity and ancestry connection in comparison to other subregions. In embodiments, the ethnicity subregion engine 265 assigns users to a plurality of ethnicity subregions for which the generated scores for the user exceed the predetermined corresponding thresholds. In embodiments, a user's highest score may be to an ethnicity subregion for which the user's score does not exceed the ethnicity subregion's threshold; but the user's second- or third-highest scores, to second and third ethnicity subregions, respectively, do exceed the corresponding thresholds, indicating that the user should be assigned thereto. Where none of a user's generated scores exceed the thresholds for the corresponding ethnicity subregions, the user may not be assigned to any subregion. Thus a user may receive zero, one, or a plurality of ethnicity subregion assignments depending on the user's generated scores and the corresponding thresholds.

Advantageously, the ethnicity subregion engine 265 plays an important role in analyzing an individual's genetic data and assigning them to an appropriate ethnicity subregion based on their genetic similarity to reference panel individuals. This can provide insights into an individual's ethnic background and geographical origins, facilitating improved user engagement with a genetic and/or genealogical research service, furthering meaningful genealogical research, and improving genetic and genealogical databases' resolution.

In some embodiments, the ethnicity subregion store 270 may be a large-scale data store. In some embodiments, the ethnicity subregion store 270 may include genetic datasets from individuals belonging to different ethnicities and geographic regions. These datasets serve as a reference panel for building the hierarchy of ethnicity regions and subregions. The ethnicity subregion store 270 may update and refine the genetic datasets to ensure their accuracy, correctness, and relevance in constructing ethnicity regions and subregions. By maintaining a diverse range of genetic datasets, the ethnicity subregion store 270 enables the computing server 130 to analyze genetic connections among individuals. This analysis leads to the construction of a hierarchy of ethnicity regions, which further includes ethnicity subregions of more specific geographical or ethnic subdivisions.

By maintaining a diverse range of genetic datasets, the ethnicity subregion store 270 enables the computing server 130 to analyze genetic connections among individuals. This analysis leads to the construction of a hierarchy of ethnicity regions, which further includes ethnicity subregions of more specific geographical or ethnic subdivisions. In some embodiments, the ethnicity subregion store 270 collaborates with the ethnicity subregion engine 265 to identify a target individual's appropriate ethnicity subregion assignment. The ethnicity subregion engine 265 may use the genetic datasets from the ethnicity subregion store 270 to compare against the target individual's genetic data, identify shared IBD segments, and generate scores for one or more ethnicity subregion.

The front-end interface 250 displays various results and data determined by the computing server 130. For example, the results may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and those in the potential family trees through one or more machine learning models or other heuristic algorithms. For example, the tree management engine 260 may try putting the target individual in various possible locations in the family tree and determine the highest probability position(s) based on the genetic dataset of the target individual and genetic datasets available for others in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 30, 2022, describes example embodiments of how an individual may be linked to existing family trees.

Example Process for Assigning Individuals to One or More Ethnicities

Figure 3:
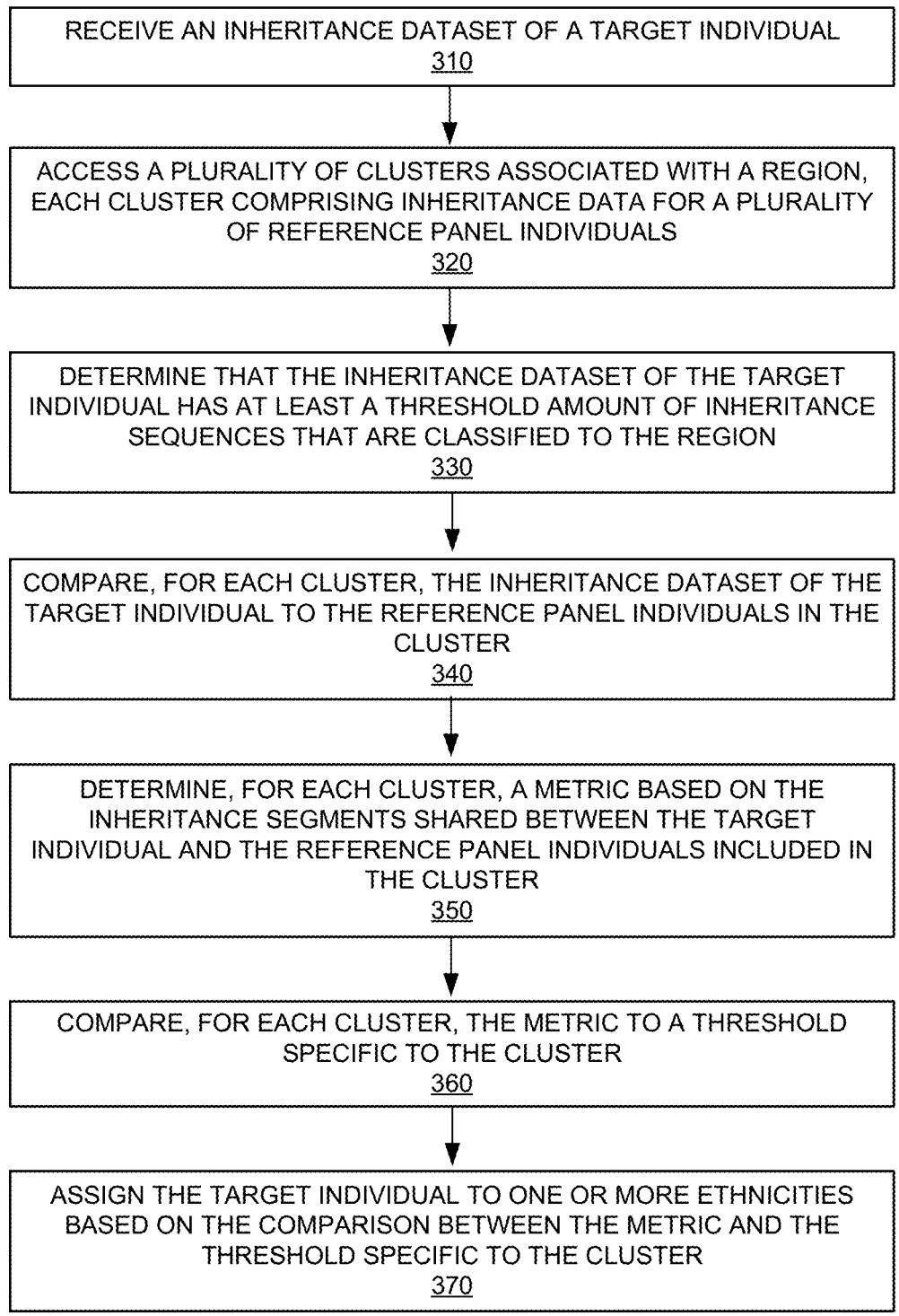
FIG. 3 is a flowchart depicting a process that assigns an individual to a cluster, in accordance with an embodiment.

FIG. 3 is a flowchart depicting an example process 300 for assigning individuals to one or more ethnicities based on a cluster approach, in accordance with some embodiments. The process may be performed by one or more engines of the computing server 130 illustrated in FIG. 2, such as the ethnicity estimation engine 245. The process 300 may be embodied as a software algorithm that may be stored as computer instructions that are executable by one or more processors. The instructions, when executed by the processors, cause the processors to perform various steps in the process 300. In various embodiments, the process may include additional, fewer, or different steps. While various steps in process 300 may be discussed with the use of computing server 130, each step may be performed by a different computing device.

In some embodiments, the computing server 130 receives an inheritance dataset of a target named entity (step 310). While genetic dataset is used as an example of inheritance dataset, the process may also apply to other types of data inheritance events. Likewise, while an individual is used as an example of a named entity, the process may also apply to other types of named entities. The genetic dataset can be a dataset stored in the genetic data store 205. In some embodiments, the genetic dataset may be phased by the computing server 130 using, e.g., the phasing engine 220, such that the genetic data is organized according to the chromosomal copies inherited from each parent. Phased data can provide valuable information about which parental haplotype specific genetic variations are originated, allowing for increased accuracy in ancestry research. The phasing engine 220 may use an Identity-by-Descent (IBD) phasing algorithm to identify long-range cross-chromosome phasing of haplotypes. This algorithm helps separate the phasing of a genotype for the majority or almost the entire genome. With this long-range cross-chromosome phasing, the computing server 130 can assign parental ethnicity regions based on the person's short IBD matches on paternally versus maternally inherited haplotypes from IBD-phased data. As a result, the computing server 130 may identify a target individual's specific subregions that are inherited from each parent. For example, the target individual's Leinster (Ireland) subregion may come from the maternal side, while the Connacht (Ireland) subregion may come from the paternal side. This level of detail is useful when providing a comprehensive and informative breakdown of a person's ancestry. In addition or alternatively to performing phasing of the genetic dataset, the computing server 130 may estimate an ethnicity or ethnicities to which the genetic dataset of the target individual corresponds using, e.g., the ethnicity estimation engine 245. The ethnicity estimate may include a percentage assignment prediction, e.g. 50% England/Wales, 50% Nigeria.

Continuing with reference to FIG. 3, in some embodiments, the computing server 130 accesses a plurality of clusters that are associated with a region. A region may be a broad geographical region that includes a number of distinct sub-populations that may be classified as multiple—and in some instances a corresponding number of—clusters. Each cluster can include genetic data for a plurality of reference panel individuals (step 320). A cluster may refer to a group of individuals who share genetic similarities that may be determined based on the extent of IBD segments or other genetic segments shared among the individuals in the group; in embodiments, the clusters may define or comprise groups of individuals linked by short matching-data segments. These similarities of the individuals in a cluster may be attributable to a shared geographic region, common ancestry, or shared genetic properties. These similarities can be determined based on the individuals' genetic datasets. The individuals within a cluster generally have closer genetic relatedness to each other than to individuals outside the cluster. Clusters can be identified through various statistical and clustering methods that analyze the genetic data and group individuals accordingly. For example, in some embodiments, the clusters may be determined using the community assignment engine 230 according to the described approach, including the use of short matching-data segments.

Clusters can vary in their size and relationship strength. Examples of clusters include geographic clusters, ancestry-based clusters, and/or admixture clusters. Individuals from a particular geographic region may form a cluster based on their shared genetic traits that developed over time due to living in the same vicinity. For example, people from a specific region in Europe (or Asia) might form a cluster due to their shared genetic characteristics determined by the environment and historical migrations. Individuals who have a common ancestor or belong to the same family lineage may form a cluster. For instance, a group of people whose ancestors belonged to a particular ethnic group or tribe might have some similar genetic traits that would place them in the same cluster. Individuals who have a mixed genetic background, such as people resulting from intermarriage between different ethnicities or populations, may form a cluster that reflects their combined heritage. This type of cluster can provide insights into historical interactions and migrations between different groups.

A region may refer to a geographical area where groups of individuals with shared genetic traits and ancestry are found. Regions could be directly associated with specific countries or broader areas encompassing multiple countries, depending on the level of genetic similarity among the people in these locations. As people within a region are likely to have a common ancestral pool, their shared genetic traits often result in the formation of clusters in genetic and genealogy analysis.

For example, suppose there is a region in western Africa where a specific ethnic group has resided for generations. Due to their shared environment, family structures, history, and genetic traits, that group of people would likely form a cluster when their DNA samples are analyzed. As a result, individuals ultimately hailing from a corresponding West African region would be matched with this cluster based on their genetic similarities, thus connecting them to their African ancestral origins. For example, individuals with Nigerian, Ghanaian, or Senegalese ancestry who share common genetic traits might form a cluster representing the West African region. People from countries like Ethiopia, Kenya, or Tanzania, who share specific genetic characteristics due to their regional and ancestral connections, may form another distinct cluster representing an East African region. Individuals with ancestral roots in regions such as Cameroon, Democratic Republic of Congo, or Gabon, sharing genetic traits unique to those areas, may form yet another cluster representing a Central African region.

Reference panel individuals may refer to a group of people whose genetic data has been collected and characterized for the purpose of providing a comparative basis in ancestry tracing and genetic analysis. These individuals typically represent various populations or ethnic groups and have well-defined genetic and/or family-history backgrounds. Reference panel individuals can be grouped into clusters associated with a specific region.

In some embodiments, the computing server 130 accesses the plurality of clusters associated with one or more regions by filtering genetic samples to exclude those from predetermined regions determined to be not relevant to a study or undesired regions. This process focuses on selecting only the genetic samples that belong to a region of interest, such as the West African region or the East African region.

In some embodiments, filtering the samples to exclude the samples from the pre-determined regions may involve excluding samples with admixted samples that are determined to be associated with a plurality of ethnicities or samples with less than a threshold (e.g., 95%) of a pre-determined ethnicity. Admixed samples are associated with multiple ethnicities. Removing these samples may help to reduce noise in the analysis, as the presence of various ethnicities within a single sample may generate ambiguous or less reliable matches or predictions with/for a sample dataset. By excluding samples that have less than a threshold assignment to a specific ethnicity, the analysis focuses on individuals whose genetic makeup predominantly belongs to a particular ethnicity. This may ensure that the focus stays on the primary source of origins rather than any potential secondary sources stemming from a smaller percentage. Advantageously, by filtering the samples in this manner, the computing server 130 can generate a more refined dataset, allowing for a more accurate and reliable assignment of individuals to specific groups and clusters.

Once the samples are filtered, the remaining samples can be used to create or organize a genetic network. The genetic network can be built by comparing the samples against one another and identifying relationships and shared genetic segments between them. The network's structure may help reveal patterns and connections among the samples and assists in the identification of clusters. The network may represent the samples as nodes and the degree of relationship (e.g., shared IBD segments, or another measurement) as edges that connect the nodes.

With the genetic network created, the computing server 130 can identify the clusters using unsupervised clustering methods, such as the Louvain method. These clusters can represent groups of reference panel individuals who share a common ancestry or ethnicity within the specific region of interest. Further details of an example of an unsupervised clustering method are discussed associated with the community assignment engine 230.

In some embodiments, the computing server 130 applies the Louvain method to identify the clusters by determining a modality of a plurality of candidate clusters. The modality may be based on genetic relatedness among samples within each candidate cluster, and adjusting boundaries of the candidate clusters to increase the modality of the genetic network. The modality can be based on the genetic relatedness among samples within each candidate cluster, which helps identify potential clusters that signify closely related groups of individuals. Once the modality of the candidate clusters has been determined, the boundaries of these clusters can be adjusted to increase their modality. For example, the clusters can be refined to ensure that the individuals within each cluster share a higher degree of genetic relatedness. This allows for more accurately assigning individuals to their ancestral origins. The boundaries of the clusters may be iteratively adjusted to increase the modality.

In embodiments, the cluster generation process may be performed iteratively as needed. For example, where an identified cluster comprises a disproportionately high number of samples, the cluster generation process may be applied to only the samples in the identified cluster to generate additional, more-granular clusters therefrom as needed. This may be performed until the identified clusters and the metadata associated with reference panel samples assigned thereto are sufficiently aligned.

In some embodiments, some of the reference panel individuals may be excluded. In some embodiments, reference panel individuals within an identified cluster can be assessed based on the distribution of their matches with other individuals. Those with few or weak matches may be considered outliers or noise that can negatively impact the accuracy of the analysis. By identifying and filtering out these outliers, a more reliable and accurate reference panel can be created.

In some embodiments, excluding the outliers includes removing individuals from the reference panel based on associated metadata including, in embodiments, tribe and/or language information. Tribe and language information can provide valuable insights into the population's background and history. By taking these factors into consideration, the process of refining clusters can help ensure that the individuals within each cluster have a shared ancestry and are more closely related to one another, making the clusters more meaningful and accurate. In some cases, individuals within a cluster may not share the same tribe or language affiliations, which could be an indication that their genetic connection is weaker or inconsistent with the rest of the cluster members. By cross-referencing the tribe and language information, these individuals can be removed from their respective clusters, ultimately leading to a more homogenous group that better represents the shared ancestry of its members. In embodiments, principal component analysis is performed to remove outliers. In embodiments, continent-level identity-by-state (IBS) segments may be identified and excluded in one or more steps, because common matched segments all over the reference panel obscure more-meaningful genealogical connections.

In some embodiments, after the outliers have been removed based on the matches distribution, the remaining clusters are now considered refined and reliable for use in the ancestry tracing method. Advantageously, this process creates a well-defined, refined, and reliable set of clusters comprising or associated with reference panel individuals within specific regions, which facilitates accurate ancestry tracing for target individuals. The computing server 130 can access these refined clusters, comprising relevant reference panel individuals, and use them for further analysis and comparison with the genetic datasets of target individuals.

Continuing with reference to FIG. 3, in some embodiments, the computing server 130 determines that the genetic dataset of the target individual has at least a threshold amount of inheritance sequences that are classified to the region (step 330). The inheritance sequences in this disclosure may be genetic sequences. A region here may be a superset of a collection of ethnicities or sub-ethnicities. The computing server 130 may use the ethnicity estimation engine 245 to compare the target individual's genetic dataset to reference panel individuals representing the region to calculate an ancestry proportion for each ethnicity in the region. The computing server 130 can determine a minimum ancestry proportion threshold that qualifies the target individual to be further analyzed for assignment to a region and determines that the target individual has met or exceeded the minimum ethnicity composition threshold for at least one ethnicity in the region. For example, the computing server 130 compares the target individual's genetic dataset to the reference panel individuals by estimating, using a hidden Markov model (HMM), the ethnicity composition of the target individual with respect to one or more ethnicities in the region. By way of example, the ethnicity composition threshold may be 5%. Thus, for example, if the computing server 130 determines that the target individual has the ethnicity composition of more than 5% of an ethnicity corresponding to a region, the computing server 130 may continue the process 300 to identify the identified cluster that the target individual's genetic data corresponds to.

Continuing with reference to FIG. 3, in some embodiments, the computing server 130 compares, for each cluster, the genetic dataset of the target individual to the reference panel individuals in the cluster to identify similarities and shared genetic segments between the target individual and the reference panel individuals (step 340). By comparing the genetic dataset of the target individual to those of reference panel individuals, it is possible to establish connections between individuals based on their genetic ancestry, significantly improving the accuracy of ethnicity assignments.

The computing server 130 can identify matched segments shared between the target individual and reference panel individuals upon comparing the genetic dataset of the target individual to the reference panel individuals in the cluster. These matched segments indicate a shared genetic heritage between the target individual and reference panel individuals, providing a basis for determining the most suitable cluster assignment for the target individual. The matched segments can include IBD segments, which are stretches of DNA inherited from a common ancestor. An IBD segment represents the genetic links shared between the target individual and a reference panel individual. These IBD segments provide evidence of a shared genetic background and can be used to assign the target individual to a specific cluster. The computing server 130 can identify IBD segments shared between the target individual and reference panel individuals using the IBD estimation engine 225 of FIG. 2. In embodiments, the shared segments are short matching-data segments, which may be between approximately 6 and 8 cM. While IBD segments are described, it will be appreciated that the disclosure is not limited thereto. Other types of shared segment, such as IBS segments, may be utilized.

Continuing with reference to FIG. 3, in some embodiments, the computing server 130 determines, for each cluster, a metric based on the inheritance segments shared between the target individual and the reference panel individuals included in the cluster (step 350). The inheritance segments may be genetic segments in this disclosure. This metric quantifies the degree of similarity between the target individual's genetic dataset and the genetic data of the reference panel individuals in each cluster. The higher the metric, the greater the shared matched segments between the individual and the reference panel individuals in the cluster, implying a closer connection to that specific group. Calculating such a metric for each cluster allows the computing server 130 to compare the target individual's genetic dataset against multiple groups and determine the most likely cluster(s) to which the individual should be assigned based on their ancestry.

In some embodiments, the computing server 130 can determine, for each cluster, the metric based on the genetic segments shared between the target individual and the reference panel individuals included in the cluster by generating a metric based on a total length and/or an average length of genetic matches between the target individual and the reference panel individuals.

To generate a metric based on the total length, the computing server 130 calculates the sum of all shared genetic match lengths between the target individual and one or more of the reference panel individuals in the cluster. A higher total length indicates a greater degree of shared genetic material between the target individual and the reference panel individuals, suggesting a closer connection to the group. To generate a metric based on the average length, the computing server 130 takes the average length of shared genetic matches between the target individual and the reference panel individuals in the cluster. This effectively normalizes the metric, accounting for varying numbers of matches while still providing a measure of how closely the target individual is related to the reference panel individuals within the group. Both of these calculations, total length and average length, may help quantify the similarity between the target individual's genetic dataset and each reference panel, providing a basis for comparing and identifying the most relevant cluster(s) for the individual's ancestry. Other ways to define a metric are also possible in various embodiments. For example, any aggregation or statistical methods, such as sum, average, highest, standard deviation, etc. may be used to define a metric.

Continuing with reference to FIG. 3, in some embodiments, the computing server 130 compares, for each cluster, the metric to a threshold specific to the cluster (step 360). The cluster-specific threshold may serve as a benchmark to determine whether or not the target individual's genetic data is closely related enough to the reference panel individuals in the cluster to be assigned to that group. Each cluster's threshold may be set based on the nature of the reference panel individuals within the cluster and, to some extent, the characteristics of the other clusters. Thresholds can be established to balance the accuracy and relevance of the ancestry assignments while minimizing potential misclassifications or noise. By comparing the metric to the threshold for each cluster, the computing server 130 can ascertain whether the target individual's genetic dataset is closely aligned with the genetic data within the cluster. This process may help assign the target individual to one or more clusters (and, consequently, ethnicities) based on the comparisons between the metric and each cluster's specific threshold. If the metric for a target individual's dataset exceeds or equals the threshold for a particular cluster, it may imply that the target individual has a strong genetic connection to that cluster, and thus can be assigned to the corresponding ethnicity or group.

In some embodiments, the computing server 130 can compare, for each cluster, the metric to the threshold specific to the cluster by: conducting admixture simulations to generate genetic data for simulated individuals with known cluster components; determining matches between the simulated genetic data of the simulated individuals and the cluster reference samples; assessing a performance for each cluster based on the metric and different potential thresholds of the determined matches; and selecting a suitable threshold for each cluster based on the assessment.

In conducting admixture simulations, the computing server 130 can generate genetic data for simulated individuals using known cluster components. The simulated individuals, which have specific ancestral backgrounds, serve as a ground truth for determining suitable thresholds later in the process. In some embodiments, the computing server 130 can conduct the admixture simulations to generate the genetic data for the individuals with the known cluster components by: conducting the admixture simulations to generate single-origin genetic data for individuals associated with one cluster; or conducting the admixture simulations to generate genetic data for individuals associated with two or more clusters.

With respect to single-origin genetic data, the computing server 130 conducts admixture simulations to create genetic data for individuals who are predominantly associated with only one cluster, meaning all their genetic information comes predominantly from one ancestral population. This may help explain how well an individual with a single origin matches back to the correct cluster. With respect to multi-origin, i.e. admixed, genetic data, the computing server generates genetic data for individuals who are associated with two or more clusters, representing mixed genetic ancestry. This situation can simulate real-world cases where individuals have ancestry from multiple populations, allowing for testing the accuracy of the method when dealing with more complex genetic backgrounds. By conducting admixture simulations using both single-origin and multi-origin genetic data, the computing server 130 can better gauge the method's performance and effectiveness in correctly assigning individuals to their respective clusters. The combination of single-origin and multi-origin genetic data may provide a comprehensive view of the method's applicability to various scenarios and ensure that the determined thresholds are suitable for individuals with diverse genetic backgrounds.

To determine matches, the computing server 130 calculates the matches between the simulated genetic data of the admixed individuals and the cluster reference samples. These matches help assess the performance and relationship between simulated individuals and each of the clusters.

The computing server 130 can assess the performance of each cluster based on the metric (e.g., a metric based on the total or average length of shared genetic matches between the target individual and the reference panel individuals in the cluster) and different potential thresholds of the determined matches. By comparing the performance, it provides insight into the optimal threshold settings to maximize accuracy and reliability for each cluster. Based on the performance assessment, the computing server 130 can select a suitable threshold for each cluster that optimizes the assignment of individuals to specific ethnicities related to their ancestral origins. This threshold selection can ensure that the method can accurately classify individuals while minimizing potential errors and cross-matches.

In some embodiments, the computing server 130 can assess the performance for each cluster based on the metric and different potential thresholds of the matches by: generating a top N IBD segments based on the metric and the matches, wherein each of the top N IBD segments comprises a segment length; and measuring the effectiveness and accuracy of the cluster by considering different potential thresholds of segment lengths for the top N IBD segments based on a balance between total matches, cross matches and/or precision thresholds to provide accurate assignment to the cluster and to reduce cross-cluster matches. "N" refers to a predetermined number of top IBD segments. These top N IBD segments can include segment lengths and represent the strongest genetic matches between the target individual and reference panel individuals in each cluster.

To measure the effectiveness and accuracy of the cluster, the computing server 130 may consider the top N IBD segments' different potential thresholds for segment lengths. This may be achieved by striking a balance between total matches, cross-cluster matches, and/or precision thresholds. The goal here is to provide an accurate assignment to the cluster while reducing cross-cluster matches, which could lead to incorrect assignments due to shared genetic sequences across multiple clusters. For example, assume there is an attempt to measure the performance for a specific cluster and it is determined that N is 10. In this case, the top 10 IBD segments would be gathered, based on the strongest genetic matches between the target individual and reference panel individuals for that cluster. By testing various potential thresholds for the segment lengths of these top 10 IBD segments, the computing server 130 would identify the ideal balance between total matches (overall number of shared segments), cross-cluster matches (shared segments between different clusters), and precision thresholds (how accurate the assignment is).

Selecting a suitable threshold for each cluster based on the assessment involves analyzing the performance results obtained from the admixture simulations. The performance may be determined by comparing the matched segments between the simulated genetic data of individuals with known cluster components and the cluster reference samples. Different potential thresholds may be evaluated to find the balance between the total count of matches and the proportion of cross-matches (matches between samples from different clusters). The suitable threshold can serve as a criterion to assign the target individual to one of the clusters based on the level of matched segments they share with the reference panel individuals in each cluster. As a result of the assessment, the selected threshold for each cluster may enable accurate assignments, maximizing precision while minimizing any cross-matches.

In some embodiments, the computing server 130 selects a suitable threshold for each cluster based on the assessment. This selection process may include examining the match results, comparing the metrics across different potential thresholds, and choosing the one that provides the most accurate and reliable assignments of the target individual to the specific cluster. Such a threshold can serve as a decision-making guideline for assigning individuals to their most likely ancestral groups.

Continuing with reference to FIG. 3, in some embodiments, the computing server 130 assigns the target individual to one or more data origins based on the comparison between the metric and the threshold specific to each cluster (step 370). The data origins in this disclosure may be ethnicities. If the metric value for a particular cluster is greater than or equal to the threshold value specific to that cluster, it indicates a significant connection between the target individual and the ethnicities represented within that cluster. In this case, the computing server 130 can assign the target individual to the ethnicity or ethnicities affiliated with that cluster. If the target individual's metric is below the threshold for a given cluster, it means the connection between the target individual and the ethnicities within that cluster is not strong enough. In this case, the computing server 130 would not assign the individual to the ethnicity or ethnicities represented by that cluster.

For example, assume that 3 clusters represent various West African ethnicities as follows:
Cluster 1: Yoruba;
Cluster 2: Igbo; and
Cluster 3: Akan.

For example, the threshold values for these three clusters can be as follows:
Cluster 1 (Yoruba): Threshold=10 cM;
Cluster 2 (Igbo): Threshold=8 cM; and Cluster 3 (Akan): Threshold=12 cM.

In this example, the target individual's genetic dataset is compared to the reference panel individuals in each cluster, and metrics are calculated for each cluster:

Cluster 1 (Yoruba): Metric=10.5 cM;
Cluster 2 (Igbo): Metric=6.5 CM; and
Cluster 3 (Akan): Metric=8 cM.

Comparing the metric values with the corresponding threshold, it can be determined that:

Cluster 1 (Yoruba): 10.5 (metric)≥10 cM (threshold)—Assign the target individual to the Yoruba ethnicity.
Cluster 2 (Igbo): 6.5 (metric)<8 cM (threshold)—Do not assign the target individual to the Igbo ethnicity.
Cluster 3 (Akan): 8 (metric)<12 cM (threshold)—Do not assign the target individual to the Akan ethnicity.

Based on the above exemplary comparison, the target individual may be assigned to the Yoruba ethnicity as that is the only cluster where the metric value is greater than or equal to the threshold, indicating a strong genetic connection to the Yoruba ethnicity.

Figure 4:
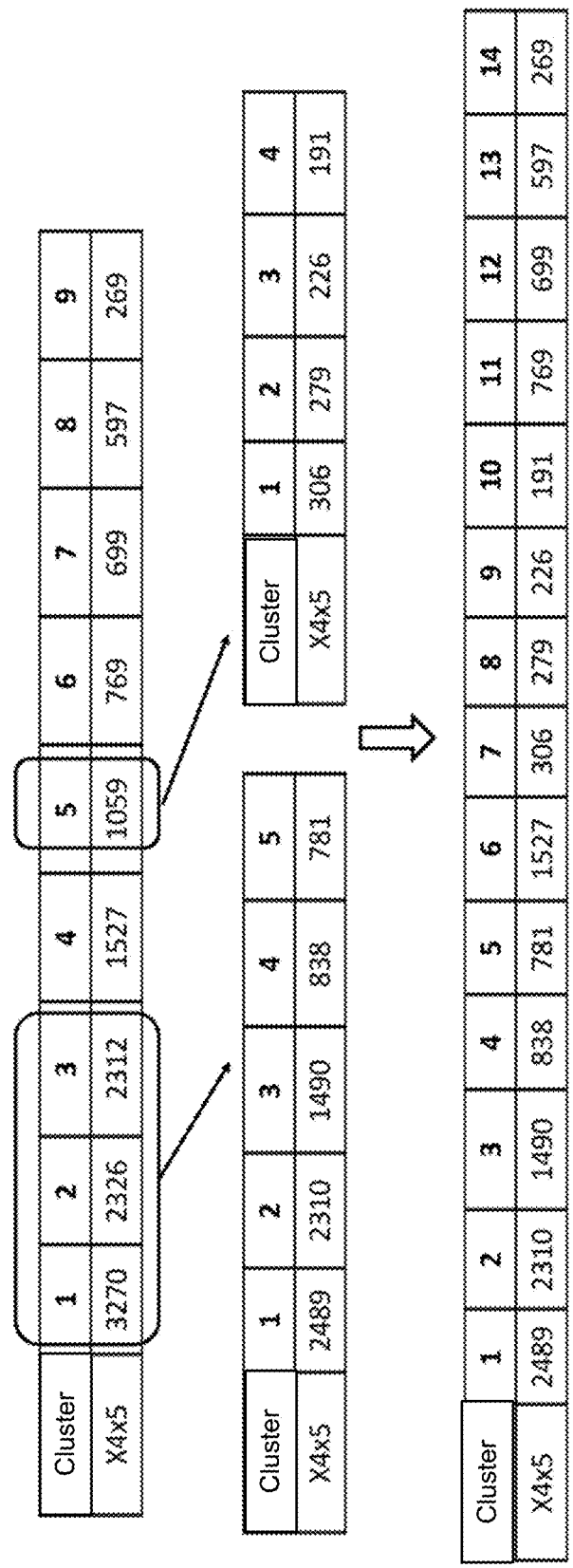
FIG. 4 depicts a process for breaking an IBD network into a plurality of clusters, in accordance with an embodiment.

FIG. 4 shows the process to break an IBD network "X4×5" of dataset (e.g., genetic data samples) into a plurality of unsupervised clusters using the Louvain method. This process can be iterative, aimed at optimizing the modularity of the network, leading to the identification of closely related groups within the dataset. Modularity is a measure that quantifies the density of edges within clusters compared to the density of edges between clusters. As shown in FIG. 4, the clusters 1, 2 and 3 of the IBD network "X4×5" are subdivided into 5 unsupervised clusters. Also, cluster 5 of the IBD network "X4×5" is subdivided into 4 clusters. This process leads the IBD network "X4×5" to now include 14 clusters.

Figure 5:
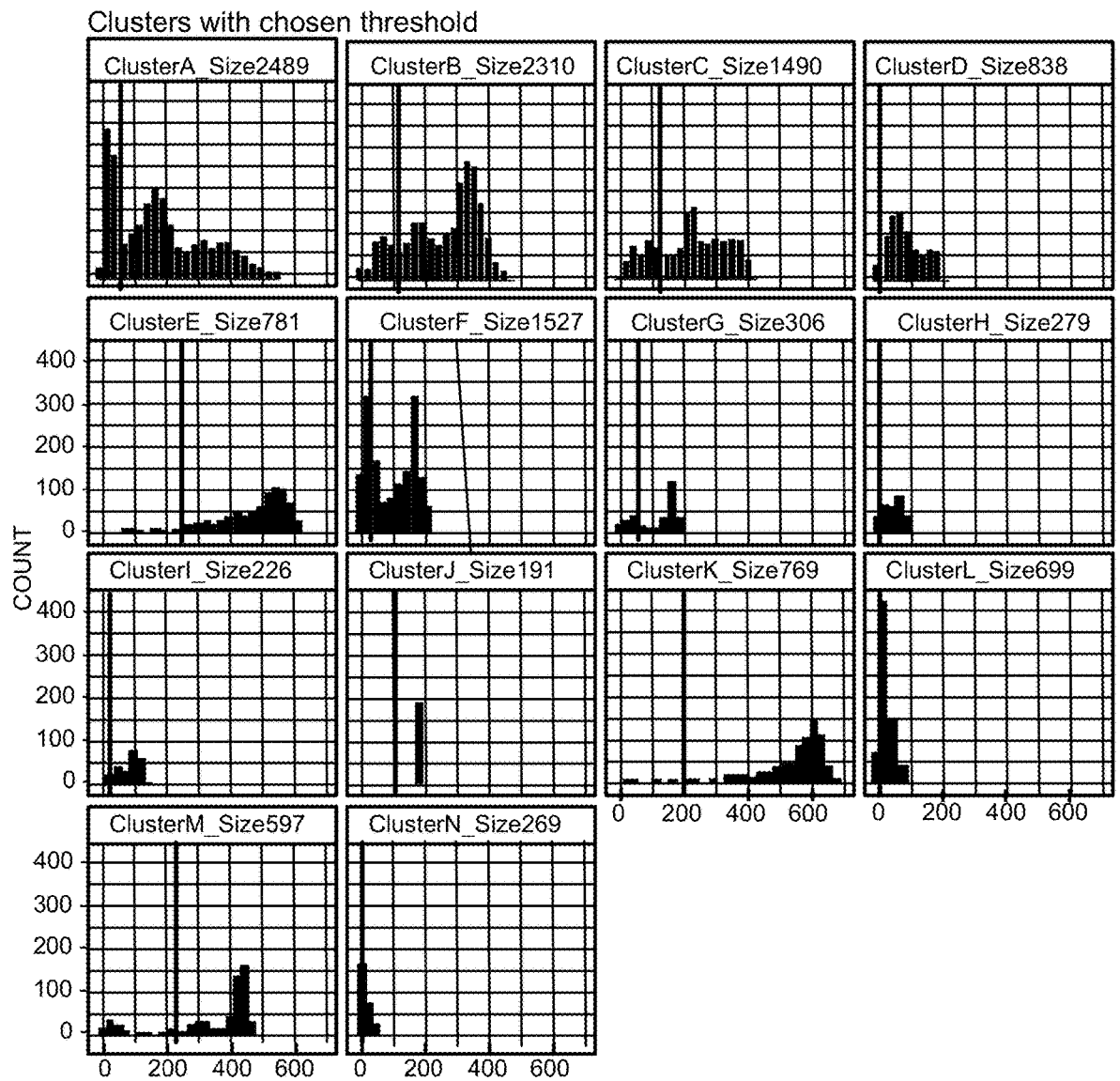
FIG. 5 illustrates unique thresholds corresponding various clusters, in accordance with some embodiments.

FIG. 5 shows 14 clusters, each cluster having a unique threshold corresponding to or determined for the unique distribution observed therewithin. Each of these clusters can be based on the genetic similarities found among the samples within the reference panel. Each cluster may have a unique threshold corresponding to or determined for the unique distribution observed therewithin. The unique threshold shown for each cluster can correspond to the optimal criteria used to assign individuals to a specific cluster based on their genetic matches. These thresholds can be determined using the admixture simulations, which involved simulating individuals with known cluster components and assessing the matches between these simulated individuals and the samples in the cluster reference panel.

Figure 6:
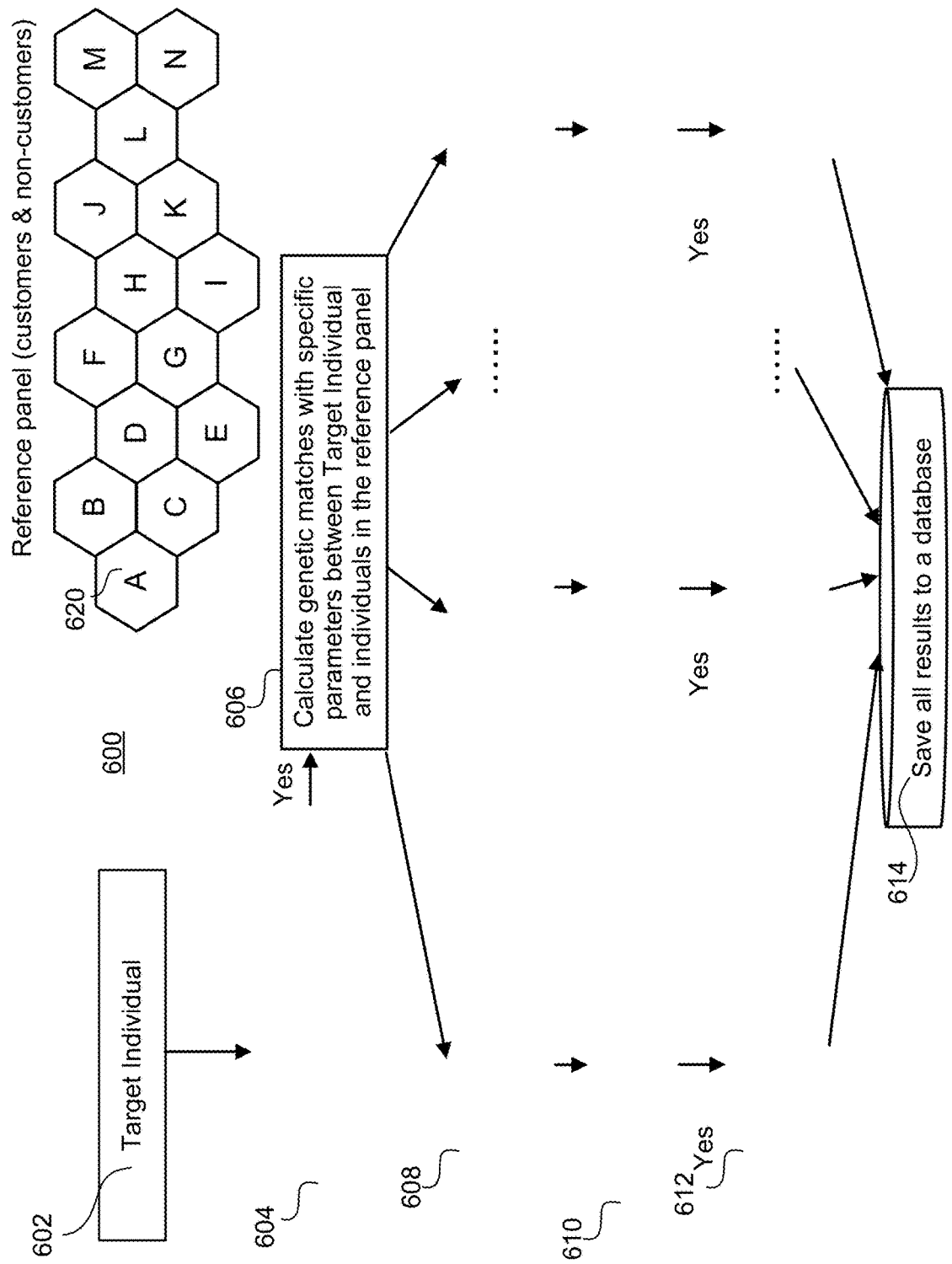
FIG. 6 illustrates a process for assigning an individual to one or more clusters, in accordance with an embodiment.

FIG. 6 shows a process 600 for assigning a target individual 602 to one or more clusters (e.g., Cluster A, Cluster B, . . . . Cluster N), in accordance with some embodiments. At step 604, the process 600 checks whether the target individual 602 has African ethnicity assignment prediction. For example, step 604 ensures that the target individual 602 has an African ethnicity-assignment prediction amount larger than 5%. It will be appreciated that the 5% threshold is merely exemplary, and any other suitable threshold may be used. The ethnicity of the target individual 602 may be determined, for example, as described in U.S. Pat. No. 10,558,930, granted Feb. 11, 2020, which is hereby incorporated in its entirety by reference.

In some embodiments, for a target individual 602 passing this threshold, a matching algorithm may be performed to identify matches between the target individual 602 and the individuals in the reference panel 620. The target individual 602 may be assigned to one or more of the clusters in the IBD network based on a number of top matches between the target individual 602 and reference panel individuals belonging to the respective clusters. The number of matches may be a top ten matches, a top 20 matches, or any other suitable number, which may vary by cluster. A threshold may be specific to each cluster and may be used to determine whether to assign the target individual 602 to a cluster on the basis of the retained top matches, e.g. the top ten matches of that sample and the constituents of the cluster. A simulation may be performed for one or more clusters to obtain ground truth for comparisons of new samples. The simulation may make use of admixture simulation to select match thresholds. This advantageously facilitates a comparison against a simulated background or makeup of the cluster to ascertain an optimized threshold. In some embodiments, admixed individuals may be simulated using known cluster components or constituents (e.g. reference panel individuals that are assigned to the cluster), with matches between the simulated admixed individuals and cluster reference panel individuals assessed. Based on these matches between simulated individuals and reference panel individuals, thresholds may be selected to optimize precision and performance.

At step 606, the process 600 calculates genetic matches between the target individual 602 and the reference panel 620, which includes samples from the 14 identified clusters (Clusters A, B, C, D, E, F, G, H, I, J, K, L, M and N). For example, the IBD estimation engine 225 of FIG. 2 may be used to calculate genetic matches between the target individual 602 and the individuals in the reference panel 620. At step 608, the process 600 performs a test for each cluster as follows: (1) for cluster A, keep the top 10 matches between the target individual 602 and reference panel individuals in cluster A, then average the length of these matches; and (2) compare the average of the top 10 matches' lengths with a specific threshold for cluster A. This test may be repeated for the remaining clusters (from B to N).

At step 608, the process 600 performs the following test for each cluster: if the average length of the top 10 matches is greater than the threshold for cluster A, the target individual 602 will be assigned to cluster A at step 612. This test may be repeated for the remaining clusters (from B to N).

With respect to step 610, to determine the suitable threshold for each cluster, the process 600 may: perform admixture simulations to generate genetic data for individuals with known cluster components; determine matches between the simulated genetic data of the individuals and the cluster reference samples; assess the performance for each cluster based on a metric (such as the average length of matched segments) and different potential thresholds of the determined matches; and select a suitable threshold for each cluster based on the assessment. With respect to step 612, it is possible to calculate the confidence of an assignment based on four thresholds. With suitable thresholds identified for each cluster, the process 600 may assign the target individual 602 to one or more ethnicities at step 612 based on the comparisons between the metric and the threshold specific to the cluster. At step 614, the results are saved to a database.

In some embodiments, sample datasets that have a top 10 matches whose average matching-segment length exceeds a predetermined threshold of one or more of the identified categories are assigned to the category, with a cluster database or other database modified to reflect the assignment of the dataset to the category or categories.

The assignment of the target individual to one or more clusters may be performed on the basis of four thresholds as shown in step 612 (e.g. 50%, 65%, 80%, and 95% confidence), though the four thresholds shown are merely exemplary and other numbers or values of thresholds may be used as suitable.

Figure 7:
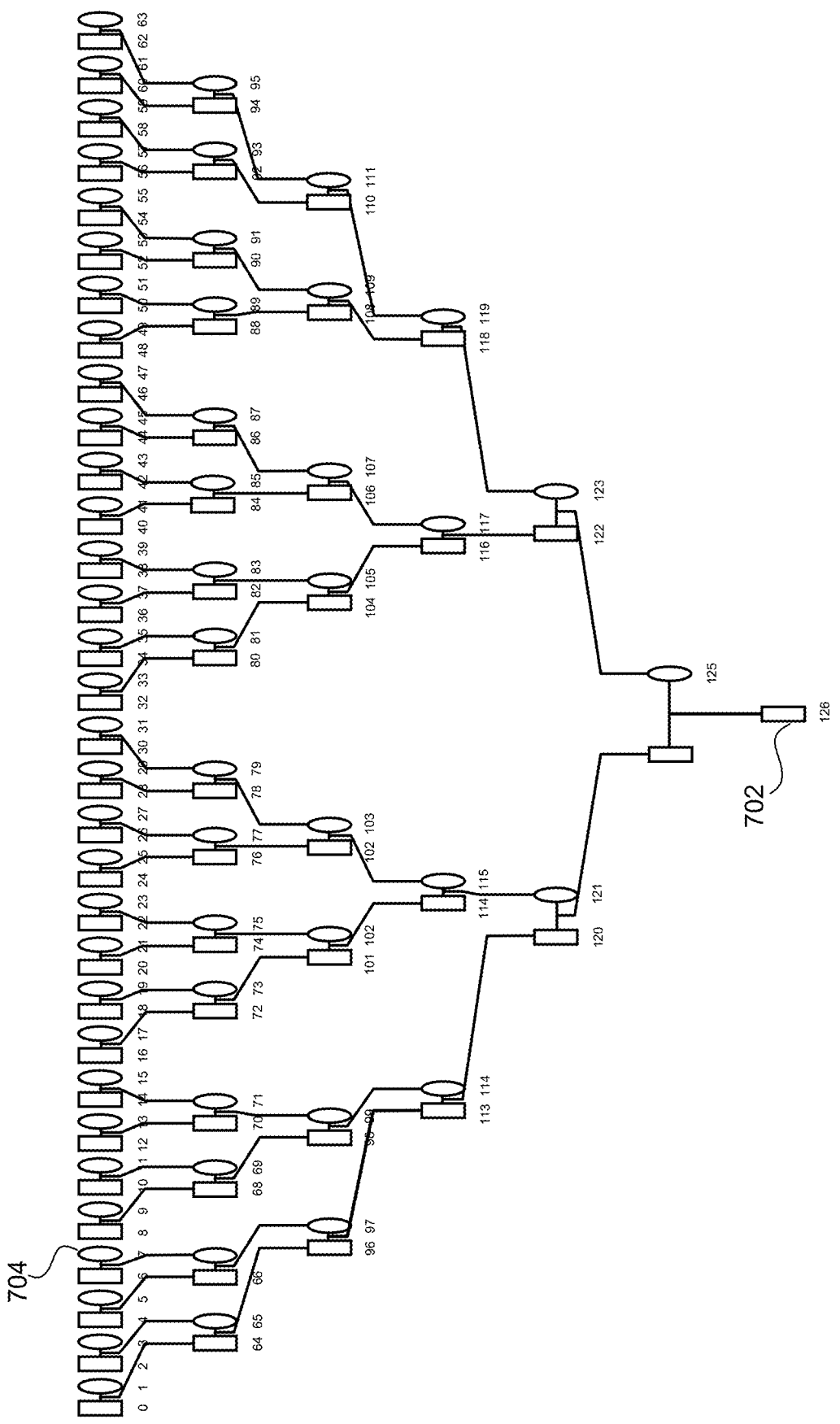
FIG. 7 depicts a simulation of an admixed individual, in accordance with an embodiment.

FIG. 7 shows the simulation 700 of an admixed individual 702 with known cluster components ("ground truth"). The simulation 700 can serve as a tool to determine optimal match thresholds for connecting individuals to their ancestral clusters. As shown in FIG. 7, a population of 64 founders 704 can be simulated and an admixed individual 702 can be synthesized after six generations. The 64 founders 704 of the first generation are at the top of the pedigree and the synthetic admixed individual 702 is at the bottom of the pedigree. By simulating admixed individuals with known cluster components or reference panel single-origin persons (their "ground truth"), the performance and precision of different threshold criteria can be assessed for the assignment strategy.

The choice to perform the simulation for 6 generations in FIG. 7 may be made to approximate the genetic makeup of a typical target individual within the context of the ancestry mapping system. Six generations may be deemed sufficient in creating a representative mix of ancestry from the initial 64 founders to the admixed individuals, providing a reliable basis for comparing matches between the simulated individuals and the reference panel's clusters. Each generation of mating introduced additional genetic recombination, which adds complexity and diversity to the simulated genetic pool. By stopping at 6 generations, a balance may be obtained between creating a reasonably mixed representation of a particular population and the computational complexity of the simulations. It will be noted that the exact number of generations in the simulation is a parameter that could be adjusted based on research goals or to achieve a higher level of accuracy in ancestry identification methods.

The goal of the admixture simulation is to assign individuals to specific clusters based on their known ancestral background, i.e., their "ground truth". By performing admixed simulations, it is possible to create simulated individuals whose genetic components are known and based on specific clusters derived from the reference panel. This can be done by starting with 64 founders or individuals representing different cluster components. For example, two setups can be used: single origin simulations (where all 64 founders were sampled from a single cluster's reference panel, such as Yoruba (a West African cluster)) and trios (where 64 founders represented predetermined proportions of three West African clusters plus a predetermined European component).

In some embodiments, six generations of recombination may be simulated for both scenarios, though it will be appreciated that the present disclosure is not limited to six generations of recombination but rather may be performed with any suitable number of generations and founders or split between clusters and European descent and with any suitable selection approach of the founders.

After simulating individuals for six generations, the matches or similarities between the simulated individuals and the cluster reference samples can be determined. This process can lead to a comparison metric that represents how closely the simulated individuals match each of the clusters in the reference panel. Using the comparison metric obtained from the matches of simulated individuals and reference clusters, different thresholds can be tested by analyzing precision rates. By comparing the results of single origin simulations and trios, it is possible to find an optimal threshold (measurable in cM) that balances precision and performance.

In some embodiments, a unique threshold may be determined for each cluster. Individual samples may be assigned to one of the clusters on a basis of the mean value of a number of top matches being greater than the threshold for that particular cluster as previously mentioned with reference to FIG. 6. For example, and as shown in FIG. 8, it has been found that, for a Cluster A, when performing admixture simulations using single-origin founders as described above, 95% precision, e.g. 95% correct assignment of target individuals to the cluster, can be achieved with the cM threshold, e.g. the cumulative length and/or number of shared segments, set at 20.3, 80% precision can be achieved with 15.3 cM, 65% precision can be achieved with 13.1 cM, and 50% precision can be achieved with 11.4 cM. The corresponding thresholds when simulating using trios are also shown in FIG. 6 as 95% precision can be achieved with the cM threshold is set at 20.5, 80% precision can be achieved with 12.9 cM, 65% precision can be achieved with 10.8 cM, and 50% precision can be achieved with 9.3 cM. To illustrate these precision thresholds, referring back to FIG. 6, the assignment of the target individual to one or more clusters may be performed on the basis of four thresholds as shown in step 612 (e.g. 50%, 65%, 80%, and 95% confidence). It will be appreciated that these four thresholds are merely exemplary embodiments and other numbers or values of thresholds may be used.

Example Process for Determining Ethnicity Subregions

Figure 10:
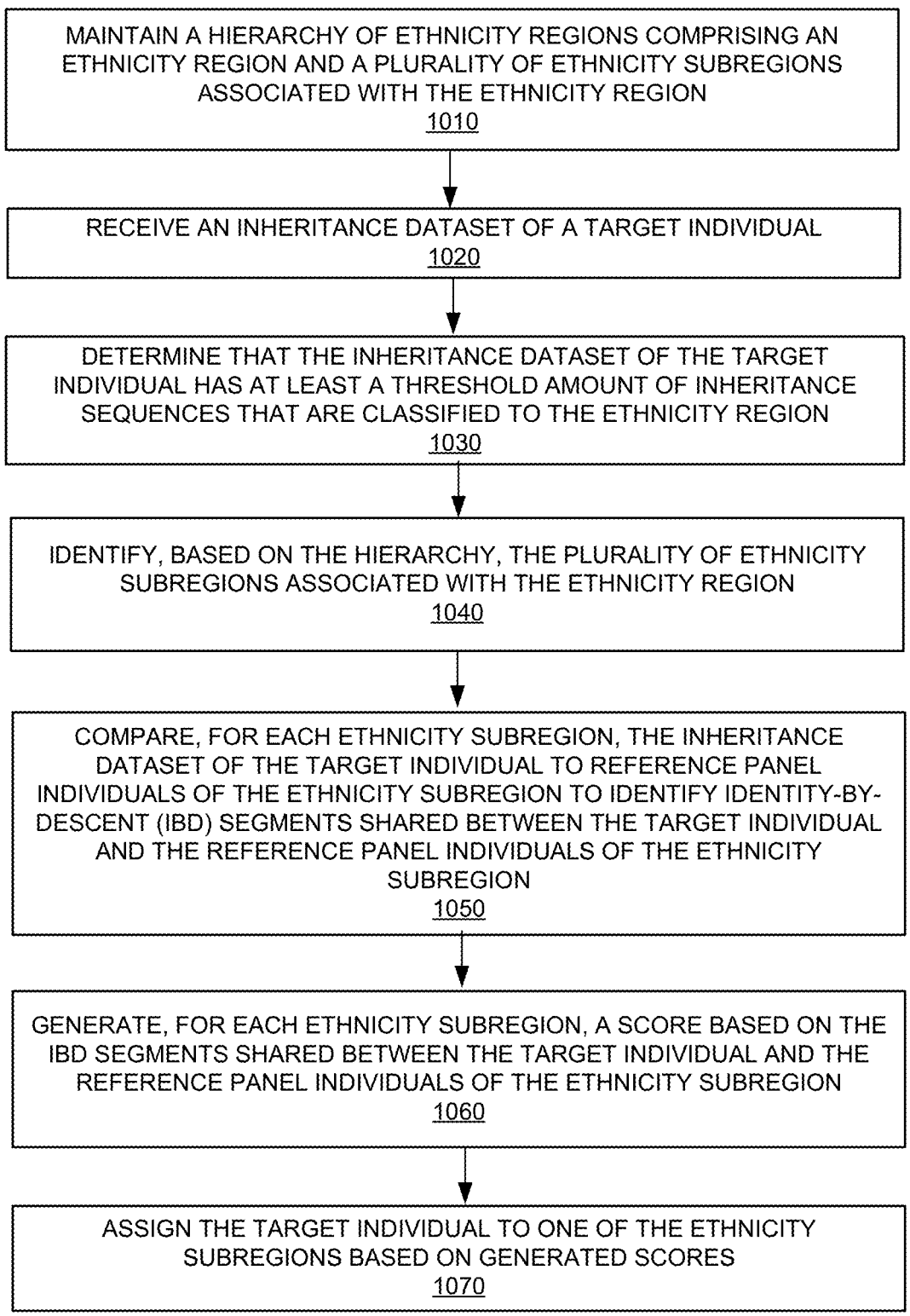
FIG. 10 is a flowchart depicting a process that determines ethnicity subregions and assigning an individual to one or more of the ethnicity subregions, in accordance with an embodiment.

FIG. 10 is a flowchart depicting an example process 1000 for determining ethnicity subregions and assigning an individual to one or more of the ethnicity subregions, in accordance with some embodiments. The process may be performed by one or more engines of the computing server 130 illustrated in FIG. 2, such as the ethnicity subregion engine 265. The process 1000 may be embodied as a software algorithm that may be stored as computer instructions that are executable by one or more processors. The instructions, when executed by the processors, cause the processors to perform various steps in the process 1000. In various embodiments, the process may include additional, fewer, or different steps. While various steps in process 1000 may be discussed with the use of computing server 130, each step may be performed by a different computing device.

In some embodiments, the computing server 130 maintains a hierarchy of ethnicity regions (step 1010). The hierarchy can include an ethnicity region and a plurality of ethnicity subregions associated with the ethnicity region.

Building and maintaining a hierarchy of ethnicity regions may involve organizing ethnicities into groups based on genetic connections. For example, the hierarchy can include an ethnicity region and multiple ethnicity subregions associated with that region. The ethnicity region represents a broader categorization, while the subregions represent more specific geographical or ethnic subdivisions within that region. For example, a hierarchy may include "Europe" as a broader ethnicity region. The "Europe" ethnicity region can include the "Northern Europe" ethnicity subregion. Within the "Northern Europe" ethnicity subregion, there is the "Scandinavia" subregion that includes both Sweden and Denmark. The Sweden and Denmark subregions can be further divided into more specific geographic locations, where different populations with genetic similarities can be found. For example, the Sweden subregion can include Southern Sweden (Götaland), Central Sweden (Svealand), and Northern Sweden (Norrland). The Denmark subregion can include Zealand (Sjælland), Jutland (Jylland), and Funen (Fyn).

In some embodiments, to build a hierarchy of ethnicity regions, genetic datasets of a reference panel from various individuals representing various ethnic and geographical backgrounds may be collected and/or maintained in the ethnicity subregion store 270. The computing server 130 may identify genetic similarities and relationships among the individuals' genetic datasets by comparing IBD segments, shared haplotypes, or single-nucleotide polymorphism (SNP) frequencies. The computing server 130 may match individuals based on phased haplotypes.

In some embodiments, one or more subregions may be manually curated based on various criteria as discussed in the ethnicity subregion engine 265. For example, in some embodiments, a subregion may be removed from under the hierarchy of a region due to historical data and/or genetic data indicating that the people in the subregion do not match to others or the people's neighbors in the corresponding geographic location. For example, due to historical migration patterns, two or more ethnicity subregions' samples may be removed from the reference panels because those ethnicity subregions represent distinct ethnicities containing individuals scattered across a continent and those individuals are matched to each other of the removed subregions rather than to the people in the geographical proximity.

In some embodiments, an ethnicity region may be divided into one or more subregions based on labels from users of the computing server 130 that provide more-detailed labels on a region and its subregions. For example, Ireland may be broken up into, e.g., Leinster, Munster, Connacht, and Ulster. The performance of such subregion division may be tested using labels with the finest granularity maintained by the computing server 130. For example, the computing server 130 may assess the performance by measure precision and recall. The computing server 130 may determine whether there is a minimum centimorgan threshold where all or most samples that should be included in a subregion while no or few samples that should not be included in the subregion are not included. The computing server 130 may also evaluate the frequency of people from a subregion have the strongest signal match to that subregion.

In some cases, the definition of a subregion may be performed through the division of a main region. In other cases, the definition of a subregion may also be performed through combining one or more regions. In yet other case, a subregion may be transferred from one main region to another, depending on how the genetic data are matched within a region. For example, in some embodiments, the genetic data may support that two subregions should be combined. Specifically, in some situation, people who match first (most strongly) to a subregion A may match second to a subregion B, while people match first to the subregion B may match most strongly to subregion A. In such a situation, the data may suggest that combining subregions A and B may improve the performance.

In another example, a list of subregions may first be defined based on geographical and historical knowledge or data, but a subregion may be removed from the list in response to the genetic data suggesting the subregion fails to perform well as a subregion. For example, the genetic data may show that individuals from a subregion A often match most strongly to any of other subregions under the hierarchy of the main region. In such a case, the subregion A may not be sufficiently unique enough as a subregion in view of other subregions in the list. As such, the subregion A may be removed from the list of subregions under a main region.

Figure 11A:
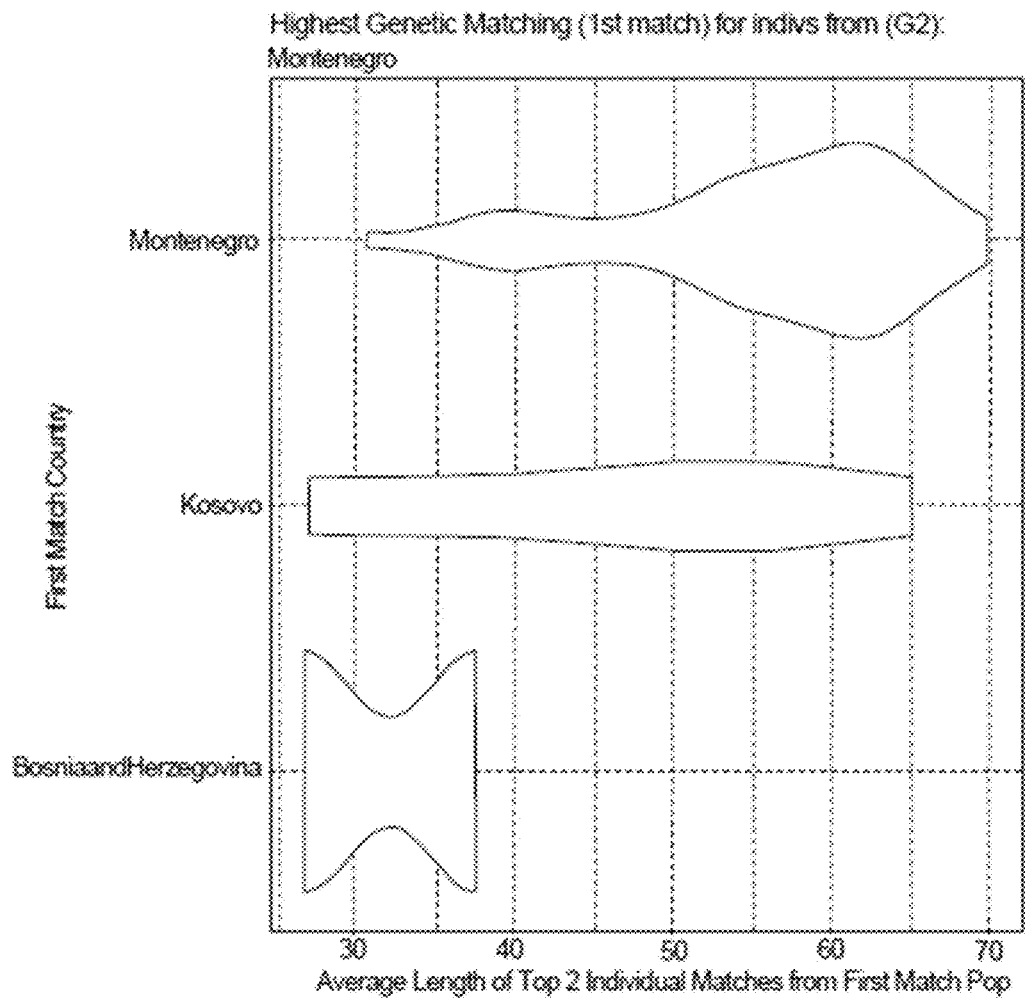
FIG. 11A depicts an example genetic matching plot of individuals from Montenegro, in accordance with an embodiment.
Figure 11B:
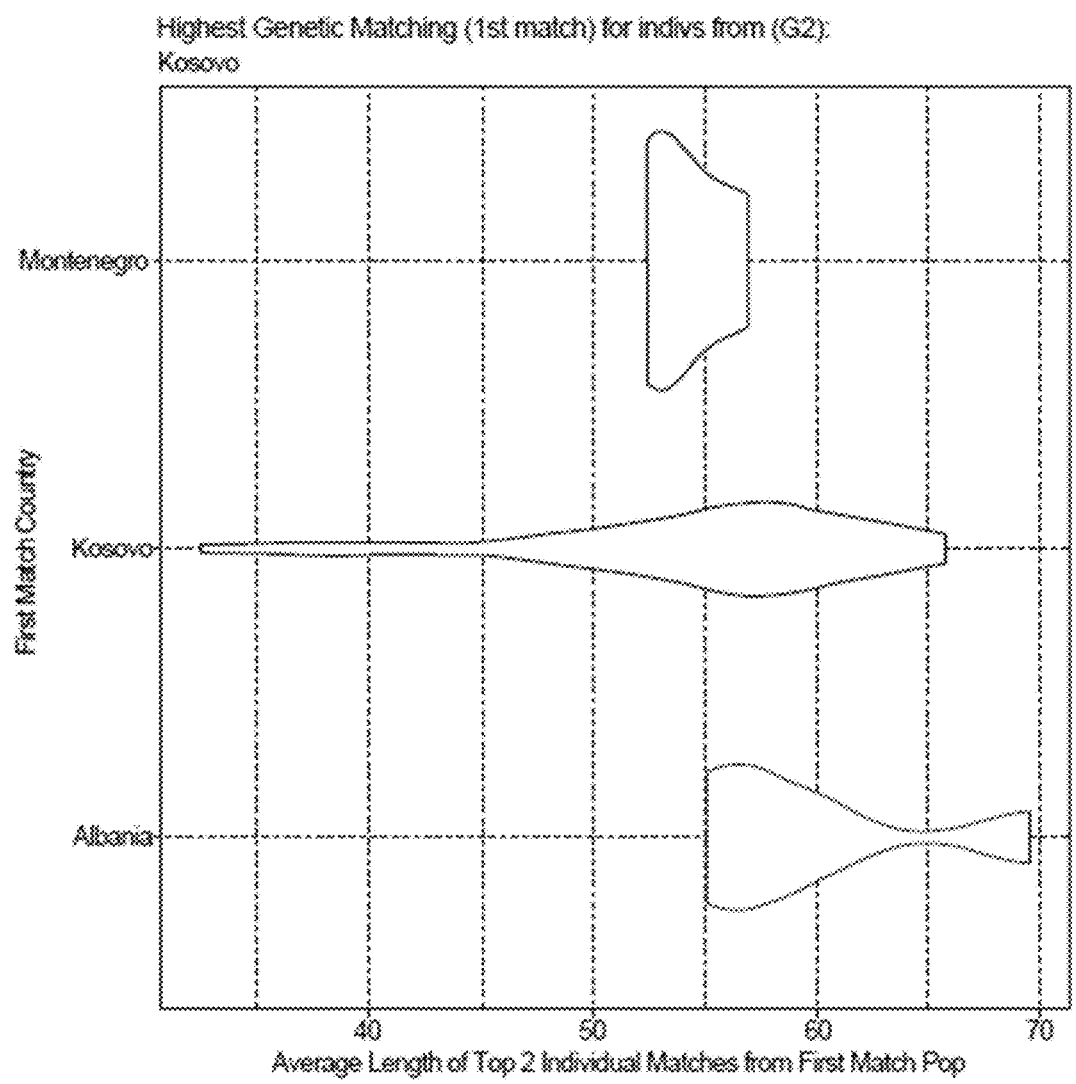
FIG. 11B depicts an example genetic matching plot of individuals from Kosovo, in accordance with an embodiment.
Figure 12:
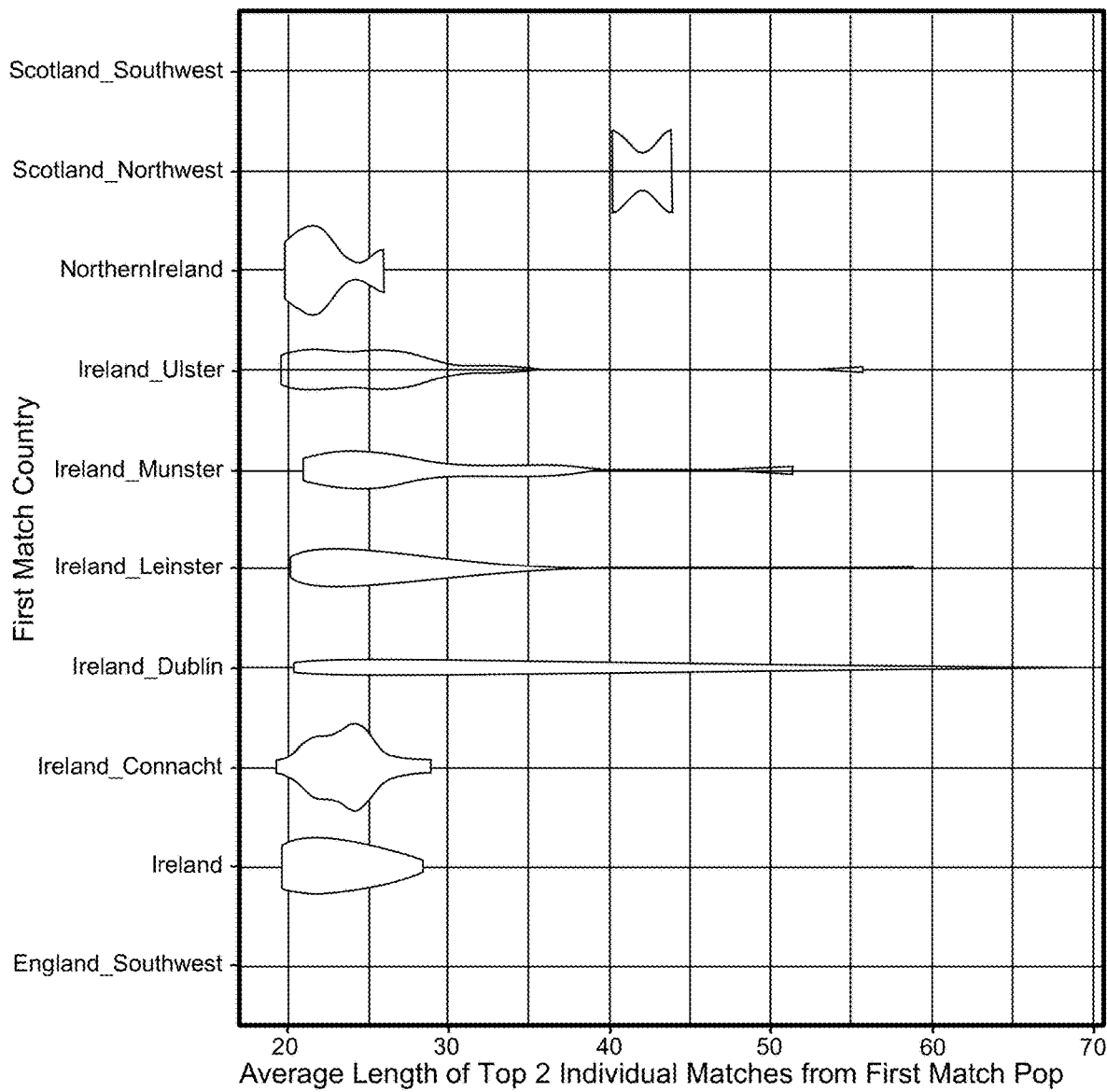
FIG. 12 depicts an example genetic matching plot of individuals from Ireland Dublin, in accordance with an embodiment.

Additional specific examples of how various subregions may be defined are illustrated in FIG. 11A through FIG. 12.

Alternatively, or additionally, in some embodiments, the computing server 130 may also apply one or more algorithmic techniques in defining ethnicity subregions. The computing server 130 may cluster individuals based on genetic connections. For example, the computing server 130 may apply clustering techniques, such as principal component analysis, hierarchical clustering, or machine learning models, to group individuals according to their genetic similarity. The resulting clusters may represent ethnicity regions and subregions.

Based on the clustering outcomes, the computing server 130 may create a high-level categorization for ethnic groups, each representing a broader geographic or ethnic classification. For example, Europe or Asia would be examples of ethnicity regions. The computing server 130 may further divide the ethnicity regions into smaller subdivisions representing more specific geographic locations, ethnic groups, or ancestral populations. The computing server 130 may further perform quality checks on the hierarchy to ensure accuracy and proper representation of ethnic groups. This may involve comparing the hierarchy's performance to known genealogical information, updating reference panel datasets, or adjusting clustering techniques to refine the subregion boundaries.

In some embodiments, the computing server 130 can define an ethnicity subregion by identifying short IBD segment matches between individuals in the ethnicity subregion for increased specificity in ancestry connections. Short IBD segment matches can indicate more distant relationships or ancestral connections, whereas long IBD segments usually suggest more recent common ancestry or closer relatives. For example, a short IBD segment can include an IBD segment of 2 cM. Short IBD segments may also refer to those with lengths equal to or below a specific threshold. The threshold may be 2 cM. The threshold can also be any one of: 3 cM, 4 cM, and 5 cM. Short IBD segments may further provide valuable insights into more distant connections between individuals, such as revealing shared geographical origins or ethnic backgrounds, when analyzed alongside other genetic data or patterns. A short IBD segment may be a segment that is well below a typical threshold that a geneticist may considered two individuals as related. For example, in some embodiments, such threshold may be 6 cM while the short segments examined by the computing server 130 in the process 1000 are 2-3 cM.

It has been surprisingly found that the use of short IBD segments provides an unexpected result in defining subregions. Segments that are well below a typical threshold of a genetic match are often discarded in any consideration because the algorithms used in the IBD estimation engine 225 can be significantly noisy with short matches. However, it was surprising that the use of short IBD segments in fact improve subregion accuracy, potentially because short segments can be helpful in defining the genetics of a population.

Short IBD segments can be more susceptible to false positives due, for example, to random matching, making them more challenging to interpret or use to accurately identify relationships. To address the problem of false positives, the computing server 130 may enhance the IBD detection method of the IBD estimation engine 225 by reducing the noise and filtering out non-informative or spurious short IBD segments. In some embodiments, this can be achieved by applying an updated version of the IBD segment identification method with an added parameter flag, allowing the IBD segment identification method to restrict phasing switch errors in the genetic sequence based on the parameter. For example, the computing server 130 may control a match between individuals with a parameter that restricts switch errors at a specified rate. A switch error may include an error that occurs when an allele from one chromosome is mistakenly phased to the other chromosome at a specific position. The computing server 130 may further analyze performance of various switch error rates to find an optimal number of match pairs in identifying short IBD segment matches for individuals in a corresponding ethnicity subregion. It was surprising that by restricting switch errors, high-quality short IBD segments can be determined and such high-quality short IBD segments in fact improve the performance of subregion definition.

In some embodiments, restricting switch error imposes a constraint on the number of phasing switch that may be tolerated in matching two IBD segments. Such restriction may be parameterized by a parameter P, which takes the value between a range, such as between 1 and 0. At one end of the range, the parameter value allows all switch errors. For example, the determination of IBD segments may first be performed using the phasing engine 220 to phase the genotypes of two individuals. In turn, the IBD estimation engine 225 is used to identify an IBD matched segment. In determining whether the two segments are matched, in some embodiments, the IBD estimation engine 225 may allow heterozygous mismatch (e.g., there is a mismatch in two segments but the alleles at the position is heterozygous) because the phasing may be incorrect. At the value of P that is set to be most relaxed, the IBD estimation engine 225 may only determine that the two segments no longer match each other at a location whether the two segments have a homozygous mismatch (e.g., one segment is TT another segment is CC) because such a homozygous mismatch unlikely comes from phasing error. The P value may be set at a more restrictive value, such as allowing only one switch error every N positions. In such a case, if there is more than one heterozygous mismatch in a range of N positions, the IBD estimation engine 225 may determine that the two segments no longer match.

In some embodiments, short IBD segments are used to define subregions but those short IBD segments are determined using a more stringent P value so that the confidence of the short IBD segment is in fact IBD is higher. For example, in some embodiments, the determination may only allow 1 in every 100 switch errors.

In some embodiments, to also address the problem of false positives, the computing server 130 may curate the reference panels to refine the subregion assignments, as discussed above. For example, the computing server 130 may remove distinct ethnicities from the reference panels that match predominantly to each other rather than to individuals in their geographic subregions to improve the accuracy and specificity of subregion identification. For example, the computing server 130 may combine subregions with overlapping genetic similarities, which, when merged, result in improved performance and increased specificity in ancestry connections for individuals. Lumping together subregions with too much cross-matching may enhance the accuracy of the data and minimize false positives.

Continuing with reference to FIG. 10, in some embodiments, the computing server 130 receives an inheritance dataset of a target named entity (step 1020). While genetic dataset is used as an example of inheritance dataset, the process may also apply to other types of data inheritance events. Likewise, while an individual is used as an example of a named entity, the process may also apply to other types of named entities. For example, the genetic dataset can be any dataset that is described in the genetic data store 205.

The genetic dataset may be phased or unphased. In some embodiments, the genetic dataset may be phased. The phasing engine 220 may use an IBD-phasing algorithm that identify a long range cross-chromosome phasing of haplotypes that basically separate the phasing of a genotype for at least the majority or almost the entire genome. Using such a long range cross-chromosome phasing, the computing server 130 may assign parental ethnicity subregions (based on a person's short IBD matches on paternally vs maternally inherited haplotypes from IBD-phased data). For example, the computing server 130 may identify that a target individual's Leinster (Ireland) subregion is from the maternal side and the target individual's Connacht (Ireland) subregion is from paternal side.

Continuing with reference to FIG. 10, in some embodiments, the computing server 130 determines that the genetic dataset of the target individual has at least a threshold amount of genetic sequences that are classified to the ethnicity region (step 1030). For example, the computing server 130 may use the ethnicity estimation engine 245 to compare the target individual's genetic dataset to reference panel individuals representing the ethnicity region to calculate an ancestry proportion for each ethnicity in the region. Then, the computing server 130 determines a minimum ancestry proportion threshold that qualifies the target individual to be further analyzed for assignment to an ethnicity subregion and determines that the target individual has met or exceeded the minimum ethnicity composition threshold for at least one ethnicity in the region. For example, the computing server 130 compares the target individual's genetic dataset to the reference panel individuals by estimating, using a hidden Markov model (HMM), the ethnicity composition of the target individual with respect to different ethnicities in the region. By way of example, the ethnicity composition threshold may be 5%. For example, if the computing server 130 determines that the target individual has the ethnicity composition of more than 5% of an ethnicity region, the computing server 130 may continue the process 1000 to identify the precise ethnicity subregion that the target individual's genetic data includes.

Continuing with reference to FIG. 10, in some embodiments, the computing server 130 identifies, based on the hierarchy, the plurality of ethnicity subregions associated with the ethnicity region (step 1040). The hierarchy may be predetermined and the computing server 130 may retrieve the hierarchy and look up the subregions under the region that is determined in step 1030.

Continuing with reference to FIG. 10, in some embodiments, the computing server 130 compares, for each ethnicity subregion, the genetic dataset of the target individual to reference panel individuals of the ethnicity subregion to identify IBD segments shared between the target individual and the reference panel individuals of the ethnicity subregion (step 1050). For example, the computing server 130 may receive a phased genetic dataset for the target individual and phased genetic datasets for reference panel individuals within an ethnicity subregion and divide the phased genetic datasets into windows, each window containing a fixed number of single nucleotide polymorphism (SNP) sites. Then, the computing server 130 may identify seed windows, indicative of shared IBD segments, in which alleles at all SNP sites match between the target individual and a reference panel individual in each subregion. The computing server 130 may expand matching windows from the seed windows to determine characteristics of the IBD segments shared between the target individual and the reference panel individuals. In some embodiments, the computing server 130 may control a match between individuals with a threshold that allows switch errors at a specified rate as previously disclosed in the present subject matter.

Continuing with reference to FIG. 10, in some embodiments, the computing server 130 generates, for each ethnicity subregion, a score based on the IBD segments shared between the target individual and the reference panel individuals of the ethnicity subregion (step 1060). For example, the computing server 130 may identify a set of reference panel individuals who have lengthiest IBD segments shared with the target individual. Examples of the reference panel individuals are further described in association with the 240. The computing server 130 may generate an average length of the IBD segments among the set of reference panel individuals, wherein the average length is the score. The generation and selection of reference panel individuals for subregions are further described in FIGS. 11-13.

For example, the computing server 130 may calculate an average score for each ethnicity subregion using the top N matches to the reference panel, in which N represents a selected number of matches for comparing the shared IBD segments between the target individual and the reference panel individuals.

Continuing with reference to FIG. 10, in some embodiments, the computing server 130 assigns the target individual to one or more of the ethnicity subregions based on generated scores (step 1070). For example, the computing server 130 may select the ethnicity subregion that has highest score average to assign to the target individual. The computing server 130 may cause to display, at a graphical user interface, the assigned ethnicity subregion to a profile of the target individual or at a panel that illustrates the ethnicity compositions of the target individual.

FIGS. 11A and 11B relate to conceptual diagrams resulting in the combination of two subregions to increase performance, in accordance with some embodiments. As previously mentioned, to address the problem of false positives, the computing server may curate the reference panels to refine the subregion assignments. FIG. 11A shows genetic matching of individuals from Montenegro. Most people match most strongly to Montenegro. People who do not match most strongly to Montenegro, match most strongly to Kosovo (or Bosnia and Herzegovina). People who match first to Kosovo match second to Montenegro.

FIG. 11B shows genetic matching of individuals from Kosovo. People from Kosovo match most strongly to Kosovo, Montenegro or Albania. People who match first to Montenegro, match second to Kosovo. Based on FIGS. 11A and 11B, to increase performance, the computing server 130 may combine the Kosovo and Montenegro ethnicity subregions.

FIG. 12 shows genetic matching of individuals from Ireland Dublin. People from the Dublin subregion often match most strongly to any of the Irish subregions or the Northwest Scotland subregion. Thus, Dublin does not perform well as a subregion and cannot be combined with other subregions (unless Ireland is a single region). Accordingly, the computing server 130 may remove Dublin a subregion under the hierarchy of the main region Ireland.

Figure 13:
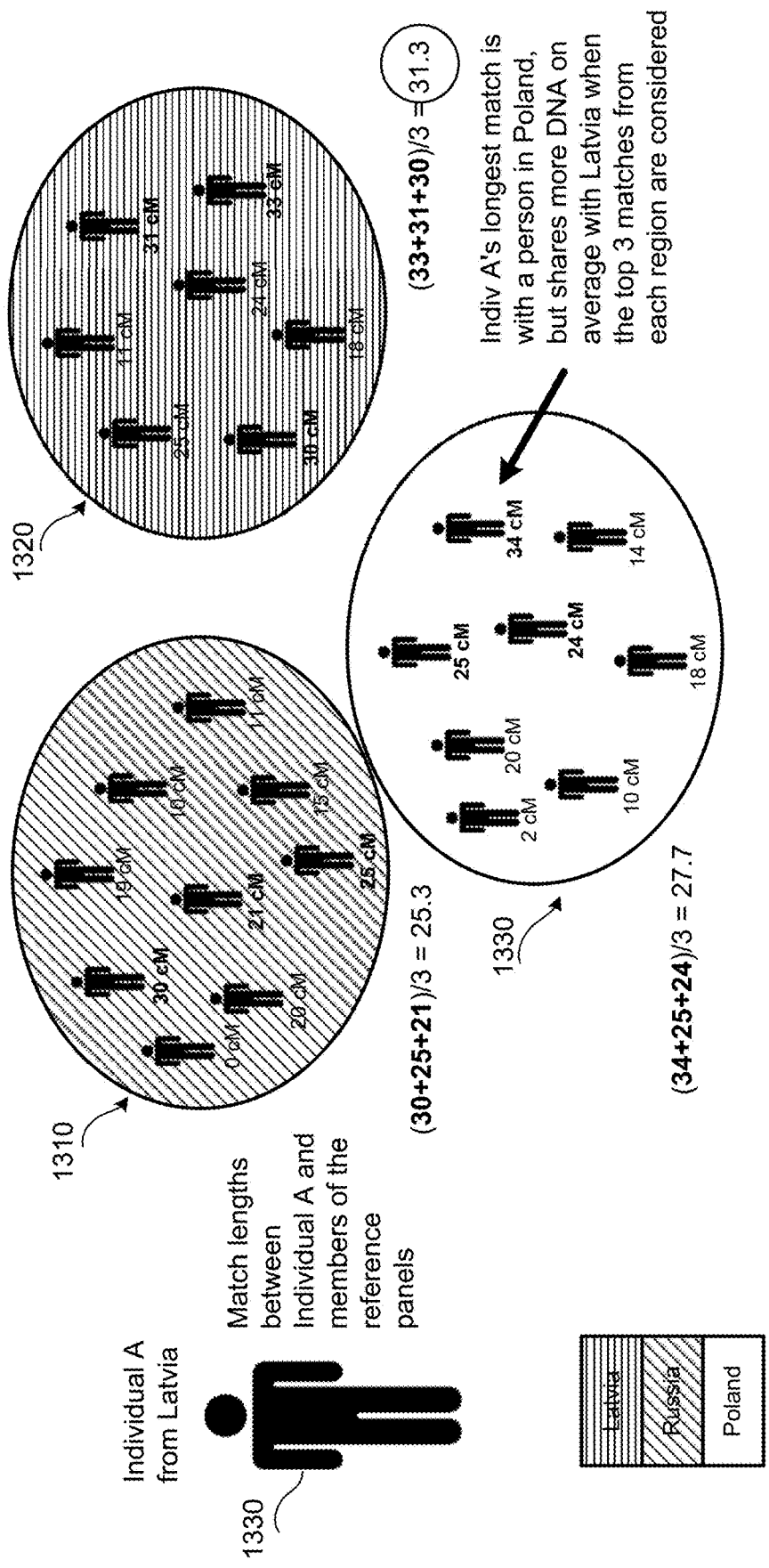
FIG. 13 illustrates an example of how a score is generated for a subregion, in accordance with an embodiment.

FIG. 13 is a conceptual diagram illustrating an example of how a score is generated for a subregion, in accordance with some embodiments. Reference panel individuals for three ethnicity subregions are shown. Reference panel 1310 corresponds to "Russia" ethnicity subregion. Reference panel 1320 corresponds to "Latvia" ethnicity subregion. Reference panel 1330 corresponds to "Poland" ethnicity subregion.

In FIG. 13, the computing server uses the "Average Top N matches" approach to account for population structure. For each ethnicity subregion, the computing server identifies a set of reference panel individuals who have the lengthiest IBD segments shared with Individual A 1300. Then, the computing server calculates the average length of the IBD segments among the top N reference panel individuals for Latvia, Russia, and Poland, respectively (e.g., top 3 matches). The scores are:

Russia: (30+25+21)/3=25.3

Latvia: (33+31+30)/3=31.3

Poland: (34+25+24)/3=27.7

Based on the calculated scores, Individual A 1300 has a higher average IBD segment length, 31.3, with Latvia compared to Russia (25.3) and Poland (27.7). This means that Individual A 1300 shares more genetic data on average with people from Latvia than from Russia or Poland. Therefore, Individual A 400 will be assigned to the "Latvia" ethnicity subregion.

Other ways to determine the score are also possible in various embodiments. For example, any aggregation or statistical methods, such as sum, average, highest, standard deviation, etc. may be used to determine a such. The computing server 130 may also input the target individual's genetic dataset to a machine learning model to generate a score to select a subregion. The machine learning model may be trained on samples that have known subregions based on genetic data of those samples.

In embodiments, a simulation approach may be utilized to assess performance thresholds for ethnicity subregion assignments. Simulations of admixed individuals using reference panel samples facilitate selection of thresholds for optimizing confidence levels in an ethnicity-subregion prediction for a given user. That is, in embodiments, a simulation of an admixed individual allows for confidently determining a cM threshold between a target user and a particular reference panel for assigning the target user to the corresponding ethnicity subregion.

In embodiments, the simulations may advantageously reflect a proportion of admixture that users of a genetic research service actually have; thus for a person with half Latvian and half Spanish extraction, for example, the simulation approach of embodiments may be configured to generate six or eight or any other suitable number of generations of admixture to generate simulations with individuals who have substantial proportions of different ethnicity subregion assignments. To this end, the approach may use existing, known data, such as trios (comprising a child and parents who have genetic datasets in the genetic datastore) and obtain associated ethnicity assignment predictions using the ethnicity assignment engine 245 therefor. For example, the approach may entail using the parents in trios and creating a simulated pedigree based on the parents.

Thus, for example, if parent one of a trio is 50% English, 25% Irish, and 25% Germanic Europe by ethnicity assignment, parent one's pedigree may include two persons of single origin to England, one person of single origin to Ireland, and one person of single origin to Germany. Such single-origin persons in parent one's pedigree may be individuals with pedigrees linking them confidently to the ethnicity subregion at a predefined level of depth.

These persons in parent one's pedigree may be selected from the reference panel store 240 and may correspond to the aforementioned ethnicity estimates based on ethnicity estimates generated for them by the ethnicity estimate engine 245. For the persons in the pedigree of parent one corresponding to ethnicities comprising single origins, an ethnicity subregion corresponding to the assigned ethnicity may be randomly selected. Thus for the two English single-origin persons, one may be randomly selected to the England: South and Southeast subregion and one may be randomly selected to the England: Northeast and East Midlands subregion, while the person assigned Irish ethnicity may be randomly assigned to Ireland: Munster subregion, and so on.

The same may be done for parent two, with a pedigree generated therefor and corresponding to parent two's ethnicity estimates, such as 25% Baltic, 25% Sweden+Denmark, 25% English, and 25% Irish (e.g., parent two has grandparents each corresponding solely to the foregoing ethnicities), with each of persons corresponding to the foregoing ethnicities randomly assigned to a particular ethnicity subregion corresponding to the ethnicity. As with parent one, single-origin reference panel individuals may be selected for the foregoing ethnicity subregions, such that parent two's ancestor with English ethnicity may be randomly assigned to the England: Northwest & West Midlands ethnicity subregion, and the ancestor with Irish ethnicity may be randomly assigned to the Ireland: Leinster ethnicity subregion, for example.

A simulation may be performed using the above-mentioned reference panel individuals and trio parents to generate admixed individuals at a suitable number of generations so as to generate representative comparisons against actual users of a genetic research service. It will be appreciated that notwithstanding the above-mentioned examples of parent one and parent two, any suitable number of trios with any suitable ethnicity admixture may be selected for a suitable number of admixture simulations.

Figure 14:
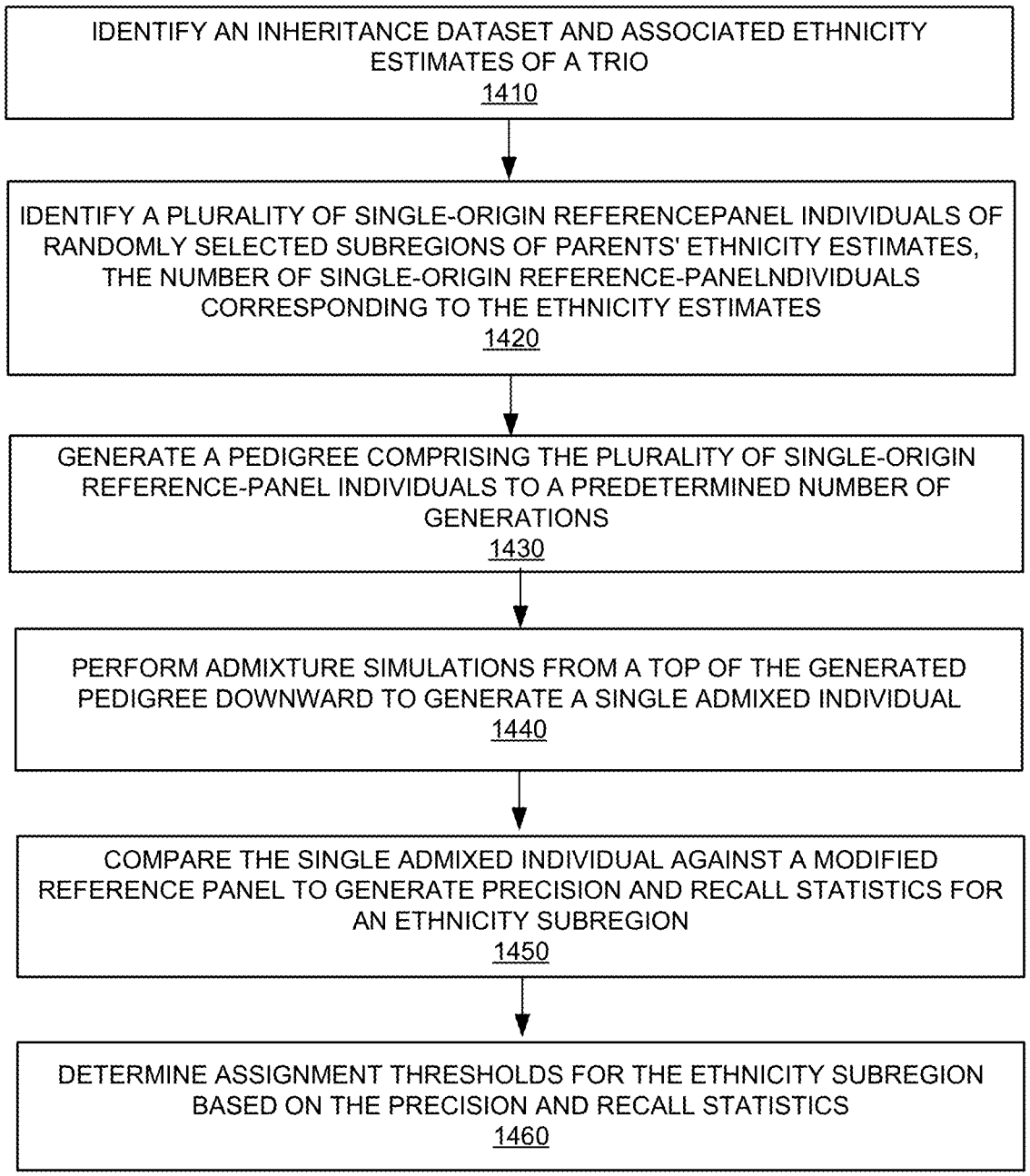
FIG. 14 is a block diagram illustrating example computer architecture, in accordance with an embodiment.

FIG. 14 is a flowchart depicting an example process 1400 for generating assignment thresholds for ethnicity subregions, in accordance with some embodiments. The process may be performed by one or more engines of the computing server 130 illustrated in FIG. 2, such as the ethnicity estimation engine 245 or the ethnicity subregion engine 265. The process 1400 may be embodied as a software algorithm that may be stored as computer instructions that may be executable by one or more processors. The instructions, when executed by the processors, cause the processors to perform various steps in the process 1400. In various embodiments, the process may include additional, fewer, or different steps. While various steps in process 1400 may be discussed with the use of computing server 130, each step may be performed by a different computing device.

In embodiments, the process 1400 includes a step 1410 of identifying an inheritance dataset and associated ethnicity estimates of a trio. While genetic dataset is used as an example of inheritance dataset, the process may also apply to other types of data inheritance events. Likewise, while an individual is used as an example of a named entity, the process may also apply to other types of named entities. The trio and associated ethnicity estimates may be identified, retrieved, received, or handled in any suitable manner. The trio may include two parents and one child, in embodiments, each of which may be associated with a genetic dataset and from/for which an ethnicity estimate has been generated, e.g. by the ethnicity estimation engine 245.

In embodiments, the child data of the trio are ignored, and the parents' data are utilized to identify at a step 1420 a plurality of single-origin reference panel individuals of randomly selected subregions corresponding to the parents' ethnicity estimates. For example, for a first parent with a 50% split between Irish and English ethnicity estimates, single-origin reference panel individuals corresponding to randomly assigned subregions within the Irish and English ethnicities may be selected in equal measure.

In a step 1430 a pedigree comprising the plurality of identified single-origin reference panel individuals of the randomly selected subregions corresponding to the parents' ethnicity estimates is generated. Any suitable number of generations may be included in the pedigree, e.g. 6 or 8 or any other suitable number. In embodiments, the number of generations included is determined based on how many generations are needed to seed the topmost generation thereof with single-origin reference panel individuals for the parents' ethnicity estimates. Thus, for example, a pedigree for a trio where one or both parents has high admixture including an ethnicity estimate of 7-8% may have more generations than a pedigree for a trio where both parents have ethnicity estimates of no less than 25%.

In a step 1440, admixture simulations are performed from the topmost generation of the generated pedigree on down to a bottommost generation to generate a simulated genetic dataset representing a single admixed individual. This may be performed using any suitable admixture simulation modality. This advantageously facilitates insight to what real-world admixed individuals with a particular ethnic heritage might look like genetically.

In a step 1450, the resulting single admixed individual's simulated genetic dataset may be compared against one or more modified reference panels to identify matches therewith and thereby to generate precision and recall statistics for the ethnicity subregion(s). In embodiments the one or more modified reference panels are modified to remove the reference panel individuals with which the pedigree was seeded to reduce potential bias.

In a step 1460, assignment thresholds for one or more ethnicity subregions may be determined based on the precision and recall statistics generated in step 1450 using the simulated admixed individual's dataset and matches from the modified reference panel. The assignment thresholds advantageously provide a benchmark for assigning individuals to an ethnicity subregion within an assigned ethnicity based on a confidence, determined from the "ground truth" data of the simulated admixed individuals, that the ethnicity subregion assignment is accurate.

Figure 15B:
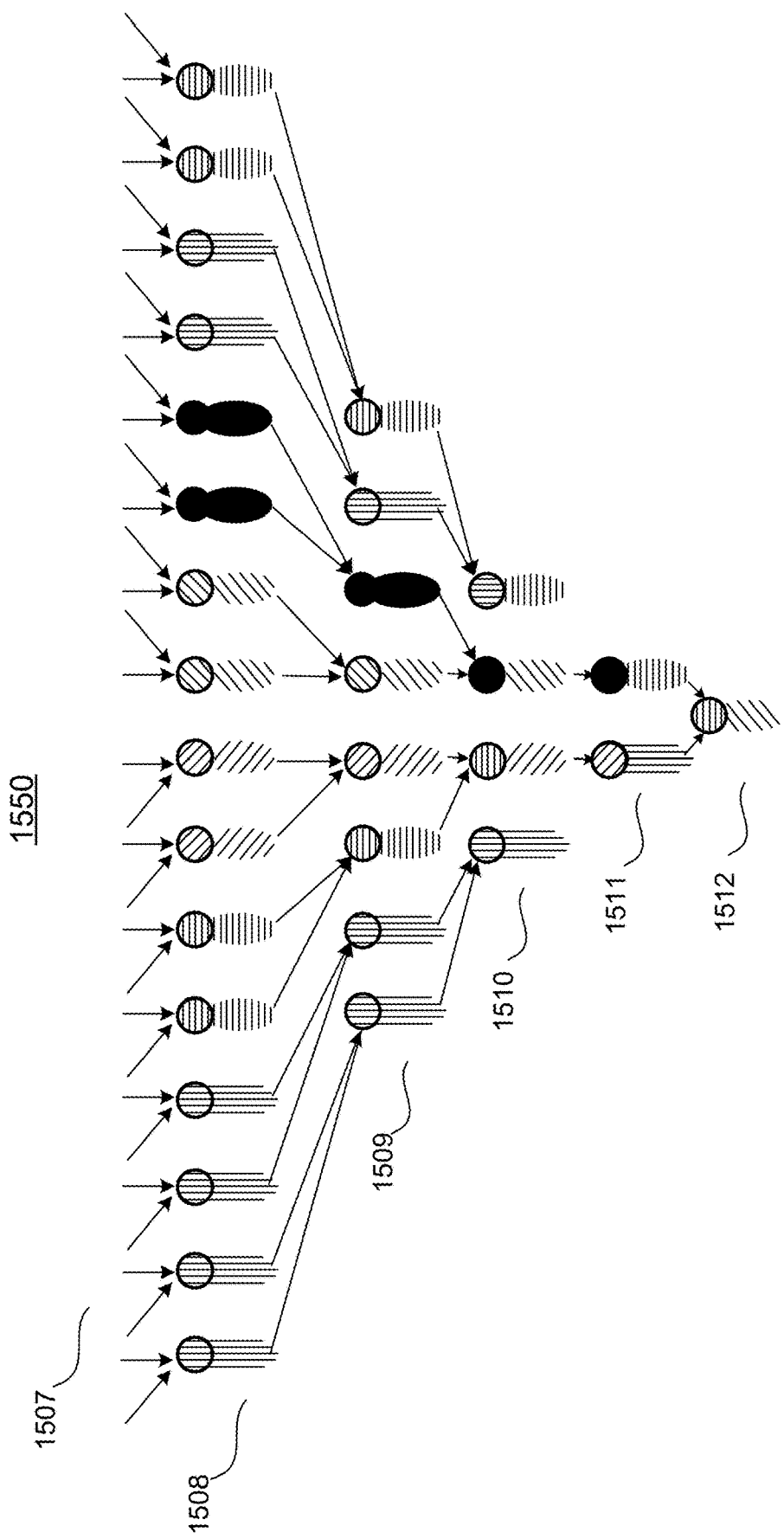
FIG. 15B depicts an example simulation of a single admixed individual from possible single origin and admixed ancestors, in accordance with an embodiment.

As seen in FIGS. 15A and 15B, parents 1502 and a child 1501 in trios may be obtained from a genetic database. The parents 1502 may each be associated with a genetic dataset and an ethnicity estimate/assignment. The data associated with the child 1501 may be ignored in embodiments. From the ethnicity estimates for the parents 1502, additional single-origin reference panel individuals may be obtained for simulating preceding generations 1503, 1504, 1505, of a pedigree 1500, up to the topmost generation of a desired number of generations. The number of generations may be determined based on a degree of admixture of the parents 1502. The single-origin reference panel individuals may correspond to randomly assigned ethnicity subregions within or corresponding to the parents' 1502 ethnicity assignments and proportions. For example, for a parent with 50% Irish ethnicity and 50% English ethnicity, equal numbers of Irish and English single-origin reference panel individuals may be used for seeding the pedigree 1500. For a parent with more granular admixture, suitable numbers of reference panel individuals corresponding to the proportions of the parent's ethnicity assignments may be selected for seeding the pedigree 1500.

The single-origin reference panel individuals of randomly selected subregions corresponding to the parents' ethnicity estimates in the topmost generation 1507 of a pedigree 1550 may be utilized for simulating a single admixed individual 1512. That is, an admixture simulation may be performed starting with the topmost generation 1507, where genetic datasets of the single-origin reference panel individuals are combined during the simulation according to statistically predicted admixture to generate "descendants" in subsequent generations 1508, 1509, 1510, 1511, until a final admixture simulation is performed to yield the single admixed individual 1512, which person 1512 may serve as "ground truth" for comparisons against reference panels for pertinent ethnicity subregions to ascertain performance or confidence thresholds for assigning genetic datasets to particular ethnicity subregions.

In some embodiments, the computing server 130 can generate a threshold specific to an ethnicity subregion by: simulating an admixed individual as described above; determining matches between the simulated genetic data of the simulated admixed individual and the reference samples for the ethnicity subregion; assessing a performance for each subregion based on different potential thresholds of the determined matches; and selecting a suitable threshold for each subregion based on the assessment. In embodiments, assessing a performance for each subregion may comprise calculating match scores such as the average top two matches for each subregion. In embodiments, the reference panel against which the simulated admixed individuals are compared is a modified reference panel that does not include the single-origin individuals used for seeding the admixture simulation, to avoid biasing the results. After calculating match scores for simulated admixed individuals, precision and recall statistics for a range of cM thresholds are determined. For example, the precision and recall are determined for assignment to Southeast England for a minimum cM threshold of 14, 18, and/or other cM thresholds. The simulated admixed individuals advantageously provide a "ground truth" for which subregion ethnicities appear in admixed individuals when true positives, false positives, and other determinations are made for determining precision and recall.

With these simulations, the accuracy of the system to assess to what extent an admixed person is reliably assigned to ethnicity subregions can be improved, as the simulations are performed on actual known admixed data. Thus the precision and recall of the system in assigning admixed persons to ethnicities and ethnicity subregions can be determined for a variety of thresholds. By using trios as described herein to represent actual customer admixture, the simulation modality is advantageously able to better reflect and generate ethnicity predictions for actual customers.

Computing Machine Architecture

Figure 9:
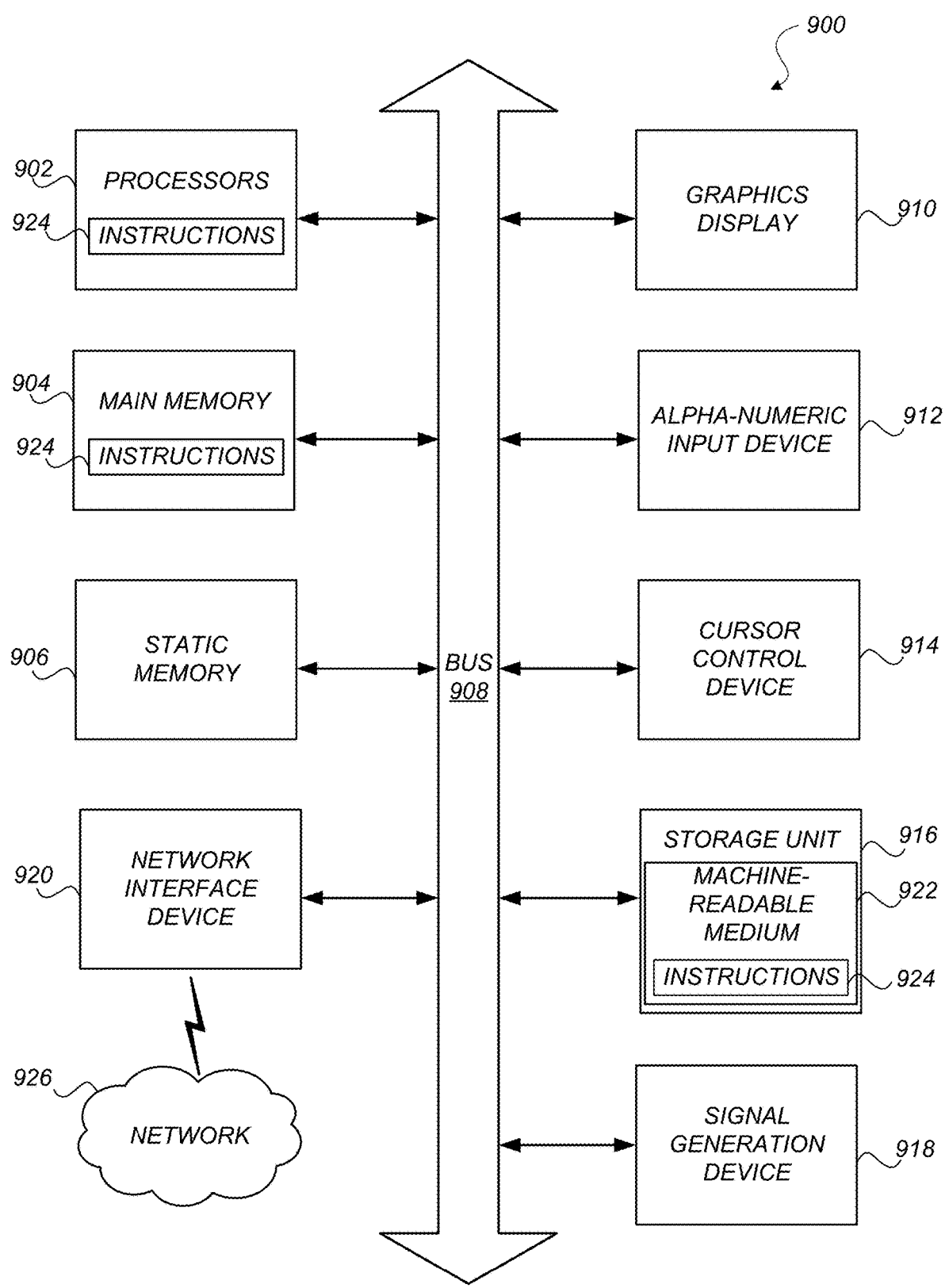
FIG. 9 is a block diagram illustrating example computer architecture, in accordance with an embodiment.

FIG. 9 is a block diagram illustrating components of an example computing machine that is capable of reading instructions from a computer-readable medium and executing them in a processor (or controller). A computer described herein may include a single computing machine shown in FIG. 9, a virtual machine, a distributed computing system that includes multiple nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in FIGS. 1 and 2, including but not limited to, the client device 110, the computing server 130, and various engines, interfaces, terminals, and machines shown in FIG. 2. While FIG. 9 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the terms "machine" and "computer" may also be taken to include any collection of machines that individually or jointly execute instructions 924 to perform any one or more of the methodologies discussed herein.

The example computer system 900 includes one or more processors 902 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 900 may also include a memory 904 that stores computer code including instructions 924 that may cause the processors 902 to perform certain actions when the instructions are executed, directly or indirectly by the processors 902. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One or more methods described herein improve the operation speed of the processor 902 and reduce the space required for the memory 904. For example, the database processing techniques and machine learning methods described herein reduce the complexity of the computation of the processors 902 by applying one or more novel techniques that simplify the steps in training, reaching convergence, and generating results of the processors 902. The algorithms described herein also reduce the size of the models and datasets to reduce the storage space requirement for memory 904.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though the specification or the claims may refer to some processes to be performed by a processor, this may be construed to include a joint operation of multiple distributed processors. In some embodiments, a computer-readable medium comprises one or more computer-readable media that, individually, together, or distributively, comprise instructions that, when executed by one or more processors, cause the one or more processors to perform, individually, together, or distributively, the steps of the instructions stored on the one or more computer-readable media. Similarly, a processor comprises one or more processors or processing units that, individually, together, or distributively, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situation such as in multiple processors of a system in a chip, in Cloud computing, or in distributed computing.

The computer system 900 may include a main memory 904, and a static memory 906, which are configured to communicate with each other via a bus 908. The computer system 900 may further include a graphics display unit 910 (e.g., a plasma display panel (PDP), a liquid crystal display (LCD), a projector, or a cathode ray tube (CRT)). The graphics display unit 910, controlled by the processor 902, displays a graphical user interface (GUI) to display one or more results and data generated by the processes described herein. The computer system 900 may also include an alphanumeric input device 912 (e.g., a keyboard), a cursor control device 914 (e.g., a mouse, a trackball, a joystick, a motion sensor, or other pointing instruments), a storage unit 916 (a hard drive, a solid-state drive, a hybrid drive, a memory disk, etc.), a signal generation device 918 (e.g., a speaker), and a network interface device 920, which also are configured to communicate via the bus 908.

The storage unit 916 includes a computer-readable medium 922 on which is stored instructions 924 embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting computer-readable media. The instructions 924 may be transmitted or received over a network 926 via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store instructions (e.g., instructions 924). The computer-readable medium may include any medium that is capable of storing instructions (e.g., instructions 924) for execution by the processors (e.g., processors 902) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Example Embodiments

In some embodiments, the disclosure described herein relate to a computer-implemented method, including: receiving an inheritance dataset of a target named entity; accessing a plurality of clusters that are associated with a region, each cluster including inheritance data for a plurality of reference panel named entities; determining that the inheritance dataset of the target named entity has at least a threshold amount of data strings that are classified to the region; comparing, for each cluster, the inheritance dataset of the target named entity to the reference panel named entities in the cluster to identify shared data string segments between the target named entity and the reference panel named entities; determining, for each cluster, a metric based on the data string segments shared between the target named entity and the reference panel named entities included in the cluster; comparing, for each cluster, the metric to a threshold specific to the cluster; and assigning the target named entity to one or more data origins based on the comparison between the metric and the threshold specific to each cluster.

In some embodiments, the disclosure described herein relate to a computer-implemented method, wherein accessing the plurality of clusters that are associated with the region includes: filtering samples to exclude samples from pre-determined regions; organizing a genetic network formed of the filtered samples to identify the clusters; excluding reference panel named entities in one or more clusters based on a distribution of matches; and accessing the one or more clusters upon excluding the reference panel named entities.

In some embodiments, the disclosure described herein relate to a computer-implemented method, wherein filtering the samples to exclude the samples from the pre-determined regions includes: excluding samples with admixture samples that are associated with a plurality of data origins or samples with less than 95% of a pre-determined data origin.

In some embodiments, the disclosure described herein relate to a computer-implemented method, wherein organizing the genetic network formed of the filtered samples to identify the clusters includes: determining a modality of a plurality of candidate clusters, wherein the modality is based on genetic relatedness among samples within each candidate cluster; and adjusting boundaries of the candidate clusters to increase the modality of the genetic network.

In some embodiments, the disclosure described herein relate to a computer-implemented method, wherein excluding the reference panel named entities in the one or more clusters based on the distribution of matches includes: removing named entities from the reference panel named entities based on tribe and/or language information to refine the one or more clusters.

In some embodiments, the disclosure described herein relate to a computer-implemented method, wherein comparing, for each cluster, the inheritance dataset of the target named entity to the reference panel named entities in the cluster to identify shared data string segments between the target named entity and the reference panel named entities includes: identifying matched segments shared between the target named entity and the reference panel named entities, wherein the matched segments include identity-by-descent (IBD) segments shared between the target named entity and one of the reference panel named entities.

In some embodiments, the disclosure described herein relate to a computer-implemented method, wherein determining, for each cluster, the metric based on the data string segments shared between the target named entity and the reference panel named entities included in the cluster includes: generating a metric based on a total length or an average length of genetic matches between the target named entity and the reference panel named entities.

In some embodiments, the disclosure described herein relate to a computer-implemented method, wherein comparing, for each cluster, the metric to the threshold specific to the cluster includes: conducting admixture simulations to generate inheritance data for named entities with known cluster components; determining matches between the simulated inheritance data of the named entities and the cluster reference samples; assessing a performance for each cluster based on the metric and different potential thresholds of the determined matches; and selecting a suitable threshold for each cluster based on the assessment.

In some embodiments, the disclosure described herein relate to a computer-implemented method, wherein conducting the admixture simulations to generate the inheritance data for the named entities with the known cluster components includes: conducting the admixture simulations to generate single-origin inheritance data for named entities associated with one cluster; or conducting the admixture simulations to generate inheritance data for named entities associated with two or more clusters.

In some embodiments, the disclosure described herein relate to a computer-implemented method, wherein assessing the performance for each cluster based on the metric and different potential thresholds of the determined matches includes: generating top N IBD segments based on the metric and the determined matches, wherein each of the top N IBD segments includes a segment length; and measuring the effectiveness and accuracy of the cluster by considering different potential thresholds of segment lengths for the top N IBD segments based on a balance between total matches, cross matches and/or precision thresholds to provide accurate assignment to the cluster and to reduce cross-cluster matches.

In some embodiments, the disclosure described herein relate to a system including: one or more processors; and memory configured to store instructions, wherein the instructions, when executed by the one or more processors, cause the one or more processors to perform steps including: receiving an inheritance dataset of a target named entity; accessing a plurality of clusters that are associated with a region, each cluster including inheritance data for a plurality of reference panel named entities; determining that the inheritance dataset of the target named entity has at least a threshold amount of data strings that are classified to the region; comparing, for each cluster, the inheritance dataset of the target named entity to the reference panel named entities in the cluster to identify shared data string segments between the target named entity and the reference panel named entities; determining, for each cluster, a metric based on the data string segments shared between the target named entity and the reference panel named entities included in the cluster; comparing, for each cluster, the metric to a threshold specific to the cluster; and assigning the target named entity to one or more data origins based on the comparison between the metric and the threshold specific to each cluster.

In some embodiments, the disclosure described herein relate to a system, wherein accessing the plurality of clusters that are associated with the region includes: filtering samples to exclude samples from pre-determined regions; organizing a genetic network formed of the filtered samples to identify the clusters; excluding reference panel named entities in one or more clusters based on a distribution of matches; and accessing the one or more clusters upon excluding the reference panel named entities.

In some embodiments, the disclosure described herein relate to a system, wherein filtering the samples to exclude the samples from the pre-determined regions includes: excluding samples with admixture samples that are associated with a plurality of data origins or samples with less than 95% of a pre-determined data origin.

In some embodiments, the disclosure described herein relate to a system, wherein organizing the genetic network formed of the filtered samples to identify the clusters includes: determining a modality of a plurality of candidate clusters, wherein the modality is based on genetic relatedness among samples within each candidate cluster; and adjusting boundaries of the candidate clusters to increase the modality of the genetic network.

In some embodiments, the disclosure described herein relate to a system, wherein excluding the reference panel named entities in the one or more clusters based on the distribution of matches includes: removing named entities from the reference panel named entities based on tribe and/or language information to refine the one or more clusters.

In some embodiments, the disclosure described herein relate to a system, wherein comparing, for each cluster, the inheritance dataset of the target named entity to the reference panel named entities in the cluster to identify shared data string segments between the target named entity and the reference panel named entities includes: identifying matched segments shared between the target named entity and the reference panel named entities, wherein the matched segments include identity-by-descent (IBD) segments shared between the target named entity and one of the reference panel named entities.

In some embodiments, the disclosure described herein relate to a system, wherein determining, for each cluster, the metric based on the data string segments shared between the target named entity and the reference panel named entities included in the cluster includes: generating a metric based on a total length or an average length of genetic matches between the target named entity and the reference panel named entities.

In some embodiments, the disclosure described herein relate to a system, wherein comparing, for each cluster, the metric to the threshold specific to the cluster includes: conducting admixture simulations to generate inheritance data for named entities with known cluster components; determining matches between the simulated inheritance data of the named entities and the cluster reference samples; assessing a performance for each cluster based on the metric and different potential thresholds of the determined matches; and selecting a suitable threshold for each cluster based on the assessment.

In some embodiments, the disclosure described herein relate to a system, wherein conducting the admixture simulations to generate the inheritance data for the named entities with the known cluster components includes: conducting the admixture simulations to generate single-origin inheritance data for named entities associated with one cluster; or conducting the admixture simulations to generate inheritance data for named entities associated with two or more clusters.

In some embodiments, the disclosure described herein relate to a non-transitory computer readable medium for storing computer code including instructions, when executed by one or more computer processors, causing one or more computer processors to perform steps including:

receiving an inheritance dataset of a target named entity; accessing a plurality of clusters that are associated with a region, each cluster including inheritance data for a plurality of reference panel named entities; determining that the inheritance dataset of the target named entity has at least a threshold amount of data strings that are classified to the region; comparing, for each cluster, the inheritance dataset of the target named entity to the reference panel named entities in the cluster to identify shared data string segments between the target named entity and the reference panel named entities; determining, for each cluster, a metric based on the data string segments shared between the target named entity and the reference panel named entities included in the cluster; comparing, for each cluster, the metric to a threshold specific to the cluster; and assigning the target named entity to one or more data origins based on the comparison between the metric and the threshold specific to each cluster.

In some embodiments, the disclosure described herein relate to a computer-implemented method, including: maintaining a hierarchy of data origin regions, the hierarchy including a data origin region and a plurality of data origin subregions associated with the data origin region; receiving an inheritance dataset of a target named entity; determining that the inheritance dataset of the target named entity has at least a threshold amount of data strings that are classified to the data origin region; identifying, based on the hierarchy, the plurality of data origin subregions associated with the data origin region; comparing, for each data origin subregion, the inheritance dataset of the target named entity to reference panel named entities of the data origin subregion to identify identity-by-descent (IBD) segments shared between the target named entity and the reference panel named entities of the data origin subregion; generating, for each data origin subregion, a score based on the IBD segments shared between the target named entity and the reference panel named entities of the data origin subregion; and assigning the target named entity to one of the data origin subregions based on generated scores.

In some embodiments, the disclosure described herein relate to a computer-implemented method, wherein maintaining the hierarchy of data origin regions includes: defining a data origin subregion by identifying short IBD segment matches between named entities in the data origin subregion for specificity in ancestry connections.

In some embodiments, the disclosure described herein relate to a computer-implemented method, wherein identifying the short IBD segment matches include: matching named entities based on phased haplotype; and controlling a match between named entities with a parameter that restricts switch errors at a specified rate.

In some embodiments, the disclosure described herein relate to a computer-implemented method, wherein matching named entities include: analyzing a performance of various switch error rates to find a number of match pairs in identifying short IBD segment matches for named entities in a corresponding data origin subregion.

In some embodiments, the disclosure described herein relate to a computer-implemented method, wherein a short IBD segment include an IBD segment of 2 cM.

In some embodiments, the disclosure described herein relate to a computer-implemented method, wherein the switch error includes an error that occurs when an allele from one chromosome is mistakenly phased to the other chromosome at a specific position.

In some embodiments, the disclosure described herein relate to a computer-implemented method, wherein maintaining the hierarchy of data origin regions further includes: removing distinct data origins from reference panels that match to each other rather than to named entities in their geographic subregion identification to improve the accuracy and specificity of subregion identification.

In some embodiments, the disclosure described herein relate to a computer-implemented method, wherein maintaining the hierarchy of data origin regions further includes: combining subregions with overlapping genetic similarities, which, when merged, result in improved performance and increased specificity in ancestry connections for named entities.

In some embodiments, the disclosure described herein relate to a computer-implemented method, wherein determining that the inheritance dataset of the target named entity has at least the threshold amount of data strings that are classified to the data origin region includes: comparing the target named entity's inheritance dataset to reference panel named entities representing the data origin region to calculate an ancestry proportion for each data origin in the region; determining a minimum ancestry proportion threshold that qualifies the target named entity to be further analyzed for assignment to a data origin subregion; and determining that the target named entity has met or exceeded the minimum ancestry proportion threshold for at least one data origin in the region.

In some embodiments, the disclosure described herein relate to a computer-implemented method, wherein comparing the target named entity's inheritance dataset to the reference panel named entities includes: estimating, using a hidden Markov model (HMM), the ancestry composition of the target named entity with respect to different data origins in the region.

In some embodiments, the disclosure described herein relate to a computer-implemented method, wherein one of the plurality of data origin subregions of the data origin region includes a cluster of named entities in the reference panel dataset with a high degree of genetic similarity and short IBD segment matches that can be attributed to a common ancestry within the data origin region.

In some embodiments, the disclosure described herein relate to a computer-implemented method, wherein comparing, for each data origin subregion, the inheritance dataset of the target named entity to the reference panel named entities of the data origin subregion to identify IBD segments includes: receiving a phased inheritance dataset for the target named entity and phased inheritance datasets for reference panel named entities within a data origin subregion; dividing the phased inheritance datasets into windows, each window containing a fixed number of single nucleotide polymorphism (SNP) sites; identifying seed windows, indicative of shared IBD segments, in which alleles at all SNP sites match between the target named entity and a reference panel named entity in each subregion; and expanding matching windows from the seed windows to determine characteristics of the IBD segments shared between the target named entity and the reference panel named entities.

In some embodiments, the disclosure described herein relate to a computer-implemented method, further including controlling a match between the target named entity and the reference panel named entities with a threshold that allows switch errors at a specified rate.

In some embodiments, the disclosure described herein relate to a computer-implemented method, wherein generating, for each data origin subregion, the score based on the IBD segments shared between the target named entity and the reference panel named entities of the data origin subregion includes: identifying a set of reference panel named entities who have lengthiest IBD segments shared with the target named entity; and generating an average length of the IBD segments among the set of reference panel named entities, wherein the average length is the score.

In some embodiments, the disclosure described herein relate to a computer-implemented method, wherein generating a score based on the IBD segments shared between the target named entity and the reference panel named entities of the data origin subregion includes: calculating an average score for each data origin subregion using the top N matches to the reference panel, in which N represents a selected number of matches for comparing the shared IBD segments between the target named entity and the reference panel named entities.

In some embodiments, the disclosure described herein relate to a computer-implemented method, wherein assigning the target named entity to one of the data origin subregions based on generated scores includes: selecting the data origin subregion that has highest score average to assign to the target named entity.

In some embodiments, the disclosure described herein relate to a system including: one or more processors; and memory configured to store instructions, wherein the instructions, when executed by the one or more processors, cause the one or more processors to perform steps including: maintaining a hierarchy of data origin regions, the hierarchy including a data origin region and a plurality of data origin subregions associated with the data origin region; receiving an inheritance dataset of a target named entity; determining that the inheritance dataset of the target named entity has at least a threshold amount of data strings that are classified to the data origin region; identifying, based on the hierarchy, the plurality of data origin subregions associated with the data origin region; comparing, for each data origin subregion, the inheritance dataset of the target named entity to reference panel named entities of the data origin subregion to identify identity-by-descent (IBD) segments shared between the target named entity and the reference panel named entities of the data origin subregion; generating, for each data origin subregion, a score based on the IBD segments shared between the target named entity and the reference panel named entities of the data origin subregion; and assigning the target named entity to one of the data origin subregions based on generated scores.

In some embodiments, the disclosure described herein relate to a system, wherein maintaining the hierarchy of data origin regions includes: defining a data origin subregion by identifying short IBD segment matches between named entities in the data origin subregion for specificity in ancestry connections.

In some embodiments, the disclosure described herein relate to a system, wherein identifying the short IBD segment matches include: matching named entities based on phased haplotype; and controlling a match between named entities with a parameter that restricts switch errors at a specified rate.

In some embodiments, the disclosure described herein relate to a system, wherein matching named entities include: analyzing a performance of various switch error rates to find a number of match pairs in identifying short IBD segment matches for named entities in a corresponding data origin subregion.

In some embodiments, the disclosure described herein relate to a non-transitory computer readable medium for storing computer code including instructions, when executed by one or more computer processors, causing one or more computer processors to perform steps including: maintaining a hierarchy of data origin regions, the hierarchy including a data origin region and a plurality of data origin subregions associated with the data origin region; receiving an inheritance dataset of a target named entity; determining that the inheritance dataset of the target named entity has at least a threshold amount of data strings that are classified to the data origin region; identifying, based on the hierarchy, the plurality of data origin subregions associated with the data origin region; comparing, for each data origin subregion, the inheritance dataset of the target named entity to reference panel named entities of the data origin subregion to identify identity-by-descent (IBD) segments shared between the target named entity and the reference panel named entities of the data origin subregion; generating, for each data origin subregion, a score based on the IBD segments shared between the target named entity and the reference panel named entities of the data origin subregion; and assigning the target named entity to one of the data origin subregions based on generated scores.

In some embodiments, the disclosure described herein relate to a computer-implemented method, including: receiving a genetic dataset of a target individual; accessing a plurality of clusters that are associated with a region, each cluster including genetic data for a plurality of reference panel individuals; determining that the genetic dataset of the target individual has at least a threshold amount of genetic sequences that are classified to the region; comparing, for each cluster, the genetic dataset of the target individual to the reference panel individuals in the cluster to identify shared genetic segments between the target individual and the reference panel individuals; determining, for each cluster, a metric based on the genetic segments shared between the target individual and the reference panel individuals included in the cluster; comparing, for each cluster, the metric to a threshold specific to the cluster; and assigning the target individual to one or more ethnicities based on the comparison between the metric and the threshold specific to each cluster.

In some embodiments, the disclosure described herein relate to a computer-implemented method, wherein accessing the plurality of clusters that are associated with the region includes: filtering samples to exclude samples from pre-determined regions; organizing a genetic network formed of the filtered samples to identify the clusters; excluding reference panel individuals in one or more clusters based on a distribution of matches; and accessing the one or more clusters upon excluding the reference panel individuals.

In some embodiments, the disclosure described herein relate to a computer-implemented method, wherein filtering the samples to exclude the samples from the pre-determined regions includes: excluding samples with admixture samples that are associated with a plurality of ethnicities or samples with less than 95% of a pre-determined ethnicity.

In some embodiments, the disclosure described herein relate to a computer-implemented method, wherein organizing the genetic network formed of the filtered samples to identify the clusters includes: determining a modality of a plurality of candidate clusters, wherein the modality is based on genetic relatedness among samples within each candidate cluster; and adjusting boundaries of the candidate clusters to increase the modality of the genetic network.

In some embodiments, the disclosure described herein relate to a computer-implemented method, wherein excluding the reference panel individuals in the one or more clusters based on the distribution of matches includes:

removing individuals from the reference panel individuals based on tribe and/or language information to refine the one or more clusters.

In some embodiments, the disclosure described herein relate to a computer-implemented method, wherein comparing, for each cluster, the genetic dataset of the target individual to the reference panel individuals in the cluster to identify shared genetic segments between the target individual and the reference panel individuals includes: identifying matched segments shared between the target individual and the reference panel individuals, wherein the matched segments include identity-by-descent (IBD) segments shared between the target individual and one of the reference panel individuals.

In some embodiments, the disclosure described herein relate to a computer-implemented method, wherein determining, for each cluster, the metric based on the genetic segments shared between the target individual and the reference panel individuals included in the cluster includes: generating a metric based on a total length or an average length of genetic matches between the target individual and the reference panel individuals.

In some embodiments, the disclosure described herein relate to a computer-implemented method, wherein comparing, for each cluster, the metric to the threshold specific to the cluster includes: conducting admixture simulations to generate genetic data for individuals with known cluster components; determining matches between the simulated genetic data of the individuals and the cluster reference samples; assessing a performance for each cluster based on the metric and different potential thresholds of the determined matches; and selecting a suitable threshold for each cluster based on the assessment.

In some embodiments, the disclosure described herein relate to a computer-implemented method, wherein conducting the admixture simulations to generate the genetic data for the individuals with the known cluster components includes: conducting the admixture simulations to generate single-origin genetic data for individuals associated with one cluster; or conducting the admixture simulations to generate genetic data for individuals associated with two or more clusters.

In some embodiments, the disclosure described herein relate to a computer-implemented method, wherein assessing the performance for each cluster based on the metric and different potential thresholds of the determined matches includes: generating top N IBD segments based on the metric and the determined matches, wherein each of the top N IBD segments includes a segment length; and measuring the effectiveness and accuracy of the cluster by considering different potential thresholds of segment lengths for the top N IBD segments based on a balance between total matches, cross matches and/or precision thresholds to provide accurate assignment to the cluster and to reduce cross-cluster matches.

In some embodiments, the disclosure described herein relate to a system including: one or more processors; and memory configured to store instructions, wherein the instructions, when executed by the one or more processors, cause the one or more processors to perform steps including: receiving a genetic dataset of a target individual; accessing a plurality of clusters that are associated with a region, each cluster including genetic data for a plurality of reference panel individuals; determining that the genetic dataset of the target individual has at least a threshold amount of genetic sequences that are classified to the region; comparing, for each cluster, the genetic dataset of the target individual to the reference panel individuals in the cluster to identify shared genetic segments between the target individual and the reference panel individuals; determining, for each cluster, a metric based on the genetic segments shared between the target individual and the reference panel individuals included in the cluster; comparing, for each cluster, the metric to a threshold specific to the cluster; and assigning the target individual to one or more ethnicities based on the comparison between the metric and the threshold specific to each cluster.

In some embodiments, the disclosure described herein relate to a system, wherein accessing the plurality of clusters that are associated with the region includes: filtering samples to exclude samples from pre-determined regions; organizing a genetic network formed of the filtered samples to identify the clusters; excluding reference panel individuals in one or more clusters based on a distribution of matches; and accessing the one or more clusters upon excluding the reference panel individuals.

In some embodiments, the disclosure described herein relate to a system, wherein filtering the samples to exclude the samples from the pre-determined regions includes: excluding samples with admixture samples that are associated with a plurality of ethnicities or samples with less than 95% of a pre-determined ethnicity.

In some embodiments, the disclosure described herein relate to a system, wherein organizing the genetic network formed of the filtered samples to identify the clusters includes: determining a modality of a plurality of candidate clusters, wherein the modality is based on genetic relatedness among samples within each candidate cluster; and adjusting boundaries of the candidate clusters to increase the modality of the genetic network.

In some embodiments, the disclosure described herein relate to a system, wherein excluding the reference panel individuals in the one or more clusters based on the distribution of matches includes: removing individuals from the reference panel individuals based on tribe and/or language information to refine the one or more clusters.

In some embodiments, the disclosure described herein relate to a system, wherein comparing, for each cluster, the genetic dataset of the target individual to the reference panel individuals in the cluster to identify shared genetic segments between the target individual and the reference panel individuals includes: identifying matched segments shared between the target individual and the reference panel individuals, wherein the matched segments include identity-by-descent (IBD) segments shared between the target individual and one of the reference panel individuals.

In some embodiments, the disclosure described herein relate to a system, wherein determining, for each cluster, the metric based on the genetic segments shared between the target individual and the reference panel individuals included in the cluster includes: generating a metric based on a total length or an average length of genetic matches between the target individual and the reference panel individuals.

In some embodiments, the disclosure described herein relate to a system, wherein comparing, for each cluster, the metric to the threshold specific to the cluster includes: conducting admixture simulations to generate genetic data for individuals with known cluster components; determining matches between the simulated genetic data of the individuals and the cluster reference samples; assessing a performance for each cluster based on the metric and different potential thresholds of the determined matches; and selecting a suitable threshold for each cluster based on the assessment.

In some embodiments, the disclosure described herein relate to a system, wherein conducting the admixture simulations to generate the genetic data for the individuals with the known cluster components includes: conducting the admixture simulations to generate single-origin genetic data for individuals associated with one cluster; or conducting the admixture simulations to generate genetic data for individuals associated with two or more clusters.

In some embodiments, the disclosure described herein relate to a non-transitory computer readable medium for storing computer code including instructions, when executed by one or more computer processors, causing one or more computer processors to perform steps including: receiving a genetic dataset of a target individual; accessing a plurality of clusters that are associated with a region, each cluster including genetic data for a plurality of reference panel individuals; determining that the genetic dataset of the target individual has at least a threshold amount of genetic sequences that are classified to the region; comparing, for each cluster, the genetic dataset of the target individual to the reference panel individuals in the cluster to identify shared genetic segments between the target individual and the reference panel individuals; determining, for each cluster, a metric based on the genetic segments shared between the target individual and the reference panel individuals included in the cluster; comparing, for each cluster, the metric to a threshold specific to the cluster; and assigning the target individual to one or more ethnicities based on the comparison between the metric and the threshold specific to each cluster.

In some embodiments, the disclosure described herein relate to a computer-implemented method, including: maintaining a hierarchy of ethnicity regions, the hierarchy including an ethnicity region and a plurality of ethnicity subregions associated with the ethnicity region; receiving a genetic dataset of a target individual; determining that the genetic dataset of the target individual has at least a threshold amount of genetic sequences that are classified to the ethnicity region; identifying, based on the hierarchy, the plurality of ethnicity subregions associated with the ethnicity region; comparing, for each ethnicity subregion, the genetic dataset of the target individual to reference panel individuals of the ethnicity subregion to identify identity-by-descent (IBD) segments shared between the target individual and the reference panel individuals of the ethnicity subregion; generating, for each ethnicity subregion, a score based on the IBD segments shared between the target individual and the reference panel individuals of the ethnicity subregion; and assigning the target individual to one of the ethnicity subregions based on generated scores.

In some embodiments, the disclosure described herein relate to a computer-implemented method, wherein maintaining the hierarchy of ethnicity regions includes: defining an ethnicity subregion by identifying short IBD segment matches between individuals in the ethnicity subregion for specificity in ancestry connections.

In some embodiments, the disclosure described herein relate to a computer-implemented method, wherein identifying the short IBD segment matches include: matching individuals based on phased haplotype; and controlling a match between individuals with a parameter that restricts switch errors at a specified rate.

In some embodiments, the disclosure described herein relate to a computer-implemented method, wherein matching individuals include: analyzing a performance of various switch error rates to find a number of match pairs in identifying short IBD segment matches for individuals in a corresponding ethnicity subregion.

In some embodiments, the disclosure described herein relate to a computer-implemented method, wherein a short IBD segment include an IBD segment of 2 cM.

In some embodiments, the disclosure described herein relate to a computer-implemented method, wherein the switch error includes an error that occurs when an allele from one chromosome is mistakenly phased to the other chromosome at a specific position.

In some embodiments, the disclosure described herein relate to a computer-implemented method, wherein maintaining the hierarchy of ethnicity regions further includes: removing distinct ethnicities from reference panels that match to each other rather than to individuals in their geographic subregion to improve the accuracy and specificity of subregion identification.

In some embodiments, the disclosure described herein relate to a computer-implemented method, wherein maintaining the hierarchy of ethnicity regions further includes: combining subregions with overlapping genetic similarities, which, when merged, result in improved performance and increased specificity in ancestry connections for individuals.

In some embodiments, the disclosure described herein relate to a computer-implemented method, wherein determining that the genetic dataset of the target individual has at least the threshold amount of genetic sequences that are classified to the ethnicity region includes: comparing the target individual's genetic dataset to reference panel individuals representing the ethnicity region to calculate an ancestry proportion for each ethnicity in the region; determining a minimum ancestry proportion threshold that qualifies the target individual to be further analyzed for assignment to an ethnicity subregion; and determining that the target individual has met or exceeded the minimum ancestry proportion threshold for at least one ethnicity in the region.

In some embodiments, the disclosure described herein relate to a computer-implemented method, wherein comparing the target individual's genetic dataset to the reference panel individuals includes: estimating, using a hidden Markov model (HMM), the ancestry composition of the target individual with respect to different ethnicities in the region.

In some embodiments, the disclosure described herein relate to a computer-implemented method, wherein one of the plurality of ethnicity subregions of the ethnicity region includes a cluster of individuals in the reference panel dataset with a high degree of genetic similarity and short IBD segment matches that can be attributed to a common ancestry within the ethnicity region.

In some embodiments, the disclosure described herein relate to a computer-implemented method, wherein comparing, for each ethnicity subregion, the genetic dataset of the target individual to the reference panel individuals of the ethnicity subregion to identify IBD segments includes: receiving a phased genetic dataset for the target individual and phased genetic datasets for reference panel individuals within an ethnicity subregion; dividing the phased genetic datasets into windows, each window containing a fixed number of single nucleotide polymorphism (SNP) sites; identifying seed windows, indicative of shared IBD segments, in which alleles at all SNP sites match between the target individual and a reference panel individual in each subregion; and expanding matching windows from the seed windows to determine characteristics of the IBD segments shared between the target individual and the reference panel individuals.

In some embodiments, the disclosure described herein relate to a computer-implemented method, further including controlling a match between the target individual and the reference panel individuals with a threshold that allows switch errors at a specified rate.

In some embodiments, the disclosure described herein relate to a computer-implemented method, wherein generating, for each ethnicity subregion, the score based on the IBD segments shared between the target individual and the reference panel individuals of the ethnicity subregion includes: identifying a set of reference panel individuals who have lengthiest IBD segments shared with the target individual; and generating an average length of the IBD segments among the set of reference panel individuals, wherein the average length is the score.

In some embodiments, the disclosure described herein relate to a computer-implemented method, wherein generating a score based on the IBD segments shared between the target individual and the reference panel individuals of the ethnicity subregion includes: calculating an average score for each ethnicity subregion using the top N matches to the reference panel, in which N represents a selected number of matches for comparing the shared IBD segments between the target individual and the reference panel individuals.

In some embodiments, the disclosure described herein relate to a computer-implemented method, wherein assigning the target individual to one of the ethnicity subregions based on generated scores includes: selecting the ethnicity subregion that has highest score average to assign to the target individual.

In some embodiments, the disclosure described herein relate to a system including: one or more processors; and memory configured to store instructions, wherein the instructions, when executed by the one or more processors, cause the one or more processors to perform steps including: maintaining a hierarchy of ethnicity regions, the hierarchy including an ethnicity region and a plurality of ethnicity subregions associated with the ethnicity region; receiving a genetic dataset of a target individual; determining that the genetic dataset of the target individual has at least a threshold amount of genetic sequences that are classified to the ethnicity region; identifying, based on the hierarchy, the plurality of ethnicity subregions associated with the ethnicity region; comparing, for each ethnicity subregion, the genetic dataset of the target individual to reference panel individuals of the ethnicity subregion to identify identity-by-descent (IBD) segments shared between the target individual and the reference panel individuals of the ethnicity subregion; generating, for each ethnicity subregion, a score based on the IBD segments shared between the target individual and the reference panel individuals of the ethnicity subregion; and assigning the target individual to one of the ethnicity subregions based on generated scores.

In some embodiments, the disclosure described herein relate to a system, wherein maintaining the hierarchy of ethnicity regions includes: defining an ethnicity subregion by identifying short IBD segment matches between individuals in the ethnicity subregion for specificity in ancestry connections.

In some embodiments, the disclosure described herein relate to a system, wherein identifying the short IBD segment matches include: matching individuals based on phased haplotype; and controlling a match between individuals with a parameter that restricts switch errors at a specified rate.

In some embodiments, the disclosure described herein relate to a system, wherein matching individuals include: analyzing a performance of various switch error rates to find a number of match pairs in identifying short IBD segment matches for individuals in a corresponding ethnicity subregion.

In some embodiments, the disclosure described herein relate to a non-transitory computer readable medium for storing computer code including instructions, when executed by one or more computer processors, causing one or more computer processors to perform steps including: maintaining a hierarchy of ethnicity regions, the hierarchy including an ethnicity region and a plurality of ethnicity subregions associated with the ethnicity region; receiving a genetic dataset of a target individual; determining that the genetic dataset of the target individual has at least a threshold amount of genetic sequences that are classified to the ethnicity region; identifying, based on the hierarchy, the plurality of ethnicity subregions associated with the ethnicity region; comparing, for each ethnicity subregion, the genetic dataset of the target individual to reference panel individuals of the ethnicity subregion to identify identity-by-descent (IBD) segments shared between the target individual and the reference panel individuals of the ethnicity subregion; generating, for each ethnicity subregion, a score based on the IBD segments shared between the target individual and the reference panel individuals of the ethnicity subregion; and assigning the target individual to one of the ethnicity subregions based on generated scores.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, or storage medium, as well. The dependencies or references in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcodes, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Pat. No. 11,429,615, entitled "Linking Individual Datasets to a Database," granted on Aug. 30, 2022, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

What is claimed is:

1. A computer-implemented method, comprising:
receiving an inheritance dataset of a target named entity;
accessing a plurality of clusters that are associated with a region, each cluster comprising inheritance data for a plurality of reference panel named entities;
determining that the inheritance dataset of the target named entity has at least a threshold amount of data strings that are classified to the region;
comparing, for each cluster, the inheritance dataset of the target named entity to the reference panel named entities in the cluster to identify shared data string segments between the target named entity and the reference panel named entities;
determining, for each cluster, a metric based on the data string segments shared between the target named entity and the reference panel named entities included in the cluster;
comparing, for each cluster, the metric to a threshold specific to the cluster; and
assigning the target named entity to one or more data origins based on the comparison between the metric and the threshold specific to each cluster.

2. The computer-implemented method of claim 1, wherein accessing the plurality of clusters that are associated with the region comprises:
filtering samples to exclude samples from pre-determined regions;
organizing a genetic network formed of the filtered samples to identify the clusters;
excluding reference panel named entities in one or more clusters based on a distribution of matches; and
accessing the one or more clusters upon excluding the reference panel named entities.

3. The computer-implemented method of claim 2, wherein filtering the samples to exclude the samples from the pre-determined regions comprises:
excluding samples with admixture samples that are associated with a plurality of data origins or samples with less than 95% of a pre-determined data origin.

4. The computer-implemented method of claim 2, wherein organizing the genetic network formed of the filtered samples to identify the clusters comprises:
determining a modality of a plurality of candidate clusters, wherein the modality is based on genetic relatedness among samples within each candidate cluster; and
adjusting boundaries of the candidate clusters to increase the modality of the genetic network.

5. The computer-implemented method of claim 2, wherein excluding the reference panel named entities in the one or more clusters based on the distribution of matches comprises:
removing named entities from the reference panel named entities based on tribe and/or language information to refine the one or more clusters.

6. The computer-implemented method of claim 1, wherein comparing, for each cluster, the inheritance dataset of the target named entity to the reference panel named entities in the cluster to identify shared data string segments between the target named entity and the reference panel named entities comprises:

identifying matched segments shared between the target named entity and the reference panel named entities, wherein the matched segments comprise identity-by-descent (IBD) segments shared between the target named entity and one of the reference panel named entities.

7. The computer-implemented method of claim 1, wherein determining, for each cluster, the metric based on the data string segments shared between the target named entity and the reference panel named entities included in the cluster comprises:

generating a metric based on a total length or an average length of genetic matches between the target named entity and the reference panel named entities.

8. The computer-implemented method of claim 1, wherein comparing, for each cluster, the metric to the threshold specific to the cluster comprises:

conducting admixture simulations to generate inheritance data for named entities with known cluster components;

determining matches between the simulated inheritance data of the named entities and the cluster reference samples;

assessing a performance for each cluster based on the metric and different potential thresholds of the determined matches; and selecting a suitable threshold for each cluster based on the assessment.

9. The computer-implemented method of claim 8, wherein conducting the admixture simulations to generate the inheritance data for the named entities with the known cluster components comprises:

conducting the admixture simulations to generate single-origin inheritance data for named entities associated with one cluster; or conducting the admixture simulations to generate inheritance data for named entities associated with two or more clusters.

10. The computer-implemented method of claim 1, further comprising:

maintaining a hierarchy of data origin regions, the hierarchy including a data origin region and a plurality of data origin subregions associated with the data origin region;

determining that the inheritance dataset of the target named entity has at least a threshold amount of data strings that are classified to the data origin region;

identifying, based on the hierarchy, the plurality of data origin subregions associated with the data origin region; comparing, for each data origin subregion, the inheritance dataset of the target named entity to reference panel named entities of the data origin subregion to identify identity-by-descent (IBD) segments shared between the target named entity and the reference panel named entities of the data origin subregion;

generating, for each data origin subregion, a score based on the IBD segments shared between the target named entity and the reference panel named entities of the data origin subregion; and assigning the target named entity to one of the data origin subregions based on generated scores.

11. A system comprising:

one or more processors; and memory configured to store instructions, wherein the instructions, when executed by the one or more processors, cause the one or more processors to perform steps comprising:

receiving an inheritance dataset of a target named entity;

accessing a plurality of clusters that are associated with a region, each cluster comprising inheritance data for a plurality of reference panel named entities;

determining that the inheritance dataset of the target named entity has at least a threshold amount of data strings that are classified to the region;

comparing, for each cluster, the inheritance dataset of the target named entity to the reference panel named entities in the cluster to identify shared data string segments between the target named entity and the reference panel named entities;

determining, for each cluster, a metric based on the data string segments shared between the target named entity and the reference panel named entities included in the cluster;

comparing, for each cluster, the metric to a threshold specific to the cluster; and assigning the target named entity to one or more data origins based on the comparison between the metric and the threshold specific to each cluster.

12. The system of claim 11, wherein accessing the plurality of clusters that are associated with the region comprises:

filtering samples to exclude samples from pre-determined regions;

organizing a genetic network formed of the filtered samples to identify the clusters;

excluding reference panel named entities in one or more clusters based on a distribution of matches; and accessing the one or more clusters upon excluding the reference panel named entities.

13. The system of claim 12, wherein filtering the samples to exclude the samples from the pre-determined regions comprises:

excluding samples with admixture samples that are associated with a plurality of data origins or samples with less than 95% of a pre-determined data origin.

14. The system of claim 12, wherein organizing the genetic network formed of the filtered samples to identify the clusters comprises:

determining a modality of a plurality of candidate clusters, wherein the modality is based on genetic relatedness among samples within each candidate cluster; and adjusting boundaries of the candidate clusters to increase the modality of the genetic network.

15. The system of claim 12, wherein excluding the reference panel named entities in the one or more clusters based on the distribution of matches comprises:

removing named entities from the reference panel named entities based on tribe and/or language information to refine the one or more clusters.

16. The system of claim 11, wherein comparing, for each cluster, the inheritance dataset of the target named entity to the reference panel named entities in the cluster to identify shared data string segments between the target named entity and the reference panel named entities comprises:

identifying matched segments shared between the target named entity and the reference panel named entities, wherein the matched segments comprise identity-bydescent (IBD) segments shared between the target named entity and one of the reference panel named entities.

17. The system of claim 11, wherein determining, for each cluster, the metric based on the data string segments shared between the target named entity and the reference panel named entities included in the cluster comprises:
generating a metric based on a total length or an average length of genetic matches between the target named entity and the reference panel named entities.

18. The system of claim 11, wherein comparing, for each cluster, the metric to the threshold specific to the cluster comprises:
conducting admixture simulations to generate inheritance data for named entities with known cluster components;
determining matches between the simulated inheritance data of the named entities and the cluster reference samples;
assessing a performance for each cluster based on the metric and different potential thresholds of the determined matches; and
selecting a suitable threshold for each cluster based on the assessment.

19. The system of claim 18, wherein conducting the admixture simulations to generate the inheritance data for the named entities with the known cluster components comprises:
conducting the admixture simulations to generate single-origin inheritance data for named entities associated with one cluster; or
conducting the admixture simulations to generate inheritance data for named entities associated with two or more clusters.

20. A non-transitory computer readable medium for storing computer code comprising instructions, when executed by one or more computer processors, causing one or more computer processors to perform steps comprising:
receiving an inheritance dataset of a target named entity;
accessing a plurality of clusters that are associated with a region, each cluster comprising inheritance data for a plurality of reference panel named entities;
determining that the inheritance dataset of the target named entity has at least a threshold amount of data strings that are classified to the region;
comparing, for each cluster, the inheritance dataset of the target named entity to the reference panel named entities in the cluster to identify shared data string segments between the target named entity and the reference panel named entities;
determining, for each cluster, a metric based on the data string segments shared between the target named entity and the reference panel named entities included in the cluster;
comparing, for each cluster, the metric to a threshold specific to the cluster; and
assigning the target named entity to one or more data origins based on the comparison between the metric and the threshold specific to each cluster.

* * * * *